(12) United States Patent
Ogaya et al.

(10) Patent No.: US 9,638,938 B2
(45) Date of Patent: May 2, 2017

(54) POLARIZING LENS AND METHOD OF MANUFACTURING THE SAME

(71) Applicants: Daisuke Ogaya, Minowa-machi (JP); Toshihiko Shimizu, Shiojiri (JP); Kenichi Tonouchi, Minowa-machi (JP); Akinori Yamamoto, Minowa-machi (JP); Masaki Ihara, Matsumoto (JP)

(72) Inventors: Daisuke Ogaya, Minowa-machi (JP); Toshihiko Shimizu, Shiojiri (JP); Kenichi Tonouchi, Minowa-machi (JP); Akinori Yamamoto, Minowa-machi (JP); Masaki Ihara, Matsumoto (JP)

(73) Assignee: EHS LENS PHILIPPINES, INC., Cavite (PH)

( * ) Notice: Subject to any disclaimer, the term of this patent is extended or adjusted under 35 U.S.C. 154(b) by 197 days.

(21) Appl. No.: 14/355,944

(22) PCT Filed: Aug. 2, 2013

(86) PCT No.: PCT/JP2013/071077
§ 371 (c)(1),
(2) Date: May 2, 2014

(87) PCT Pub. No.: WO2014/021466
PCT Pub. Date: Feb. 6, 2014

(65) Prior Publication Data
US 2014/0293217 A1    Oct. 2, 2014

(30) Foreign Application Priority Data

Aug. 2, 2012    (JP) ................................ 2012-172255

(51) Int. Cl.
*G02C 3/00*    (2006.01)
*G02C 7/12*    (2006.01)
(Continued)

(52) U.S. Cl.
CPC ................ *G02C 7/12* (2013.01); *B29C 39/10* (2013.01); *B29D 11/00644* (2013.01); *G02B 5/3033* (2013.01); *B29K 2715/006* (2013.01)

(58) Field of Classification Search
CPC .... G02B 5/3033; G02B 5/3025; G02B 27/26; G02B 5/30; G02B 1/08; G02B 5/223; G02C 7/12
(Continued)

(56) References Cited

U.S. PATENT DOCUMENTS 7,767,304 B2    8/2010    Berzon
2006/0023160 A1*    2/2006    Cartier .................. A42B 3/226
                                                              351/159.61
(Continued)

FOREIGN PATENT DOCUMENTS

CN    1343892 A    4/2002
CN    101910892 A    12/2010
(Continued)

OTHER PUBLICATIONS

Feb. 3, 2015 International Preliminary Report on Patentability issued in International Application No. PCT/JP2013/071077.
(Continued)

*Primary Examiner* — Ricky Mack
*Assistant Examiner* — Daniele Manikeu
(74) *Attorney, Agent, or Firm* — Oliff PLC

(57) ABSTRACT

The invention relates to a method of manufacturing a polarizing lens, including conducting curved surface processing to change a shape of a polarizing film into a shape of a curved surface, conducting heat treatment by heating polarizing film that has been processed into a curved surface to a heating temperature of equal to or higher than 105° C. but less than 150° C., assembling an upper mold, a lower mold, and a seal member to provide a casting mold having (Continued)

a cavity within which the polarizing film following heating treatment is positioned, upper and lower molds being positioned opposite each other to sandwich the polarizing film at a space therebetween, and seal member sealing space between the upper and lower molds, casting a curable composition into the cavity, curing curable composition to provide a polarizing lens within which a polarizing film is positioned, and separating polarizing lens thus provided from casting mold.

11 Claims, 10 Drawing Sheets

(51) Int. Cl.
 *B29C 39/10* (2006.01)
 *B29D 11/00* (2006.01)
 *G02B 5/30* (2006.01)

(58) Field of Classification Search
 USPC ..... 359/487.02, 485.03, 492.01; 351/159.56, 351/159.27, 49
 See application file for complete search history.

(56) References Cited

U.S. PATENT DOCUMENTS

| | | | |
|---|---|---|---|
| 2007/0058253 A1* | 3/2007 | Aiiso | B29D 11/0073 359/485.03 |
| 2007/0098999 A1 | 5/2007 | Berzon | |
| 2009/0091825 A1 | 4/2009 | Saito et al. | |
| 2009/0152747 A1* | 6/2009 | Hsu | B29D 11/0073 264/1.32 |
| 2009/0201584 A1† | 8/2009 | Ryu et al. | |
| 2013/0208239 A1* | 8/2013 | Jiang | B29D 11/00644 351/159.56 |

FOREIGN PATENT DOCUMENTS

| | | | |
|---|---|---|---|
| JP | 2001330806 A | | 11/2001 |
| JP | 2002-267841 | † | 9/2002 |
| JP | 2002-267841 A | | 9/2002 |
| JP | 2007052210 A | * | 3/2007 |
| JP | 2007168310 A | | 7/2007 |
| JP | 2007523768 A | | 8/2007 |
| JP | 2007316595 A | | 12/2007 |
| JP | 2011-033831 | † | 2/2011 |
| JP | 2011-033831 A | | 2/2011 |
| JP | 2011-145513 | † | 7/2011 |
| JP | 2011145513 A | * | 7/2011 |
| WO | 2009098886 A1 | | 8/2009 |

OTHER PUBLICATIONS

Feb. 12, 2015 European Third Party Observation issued in European Application No. 13825675.5.
Dec. 2, 2014 Third Party Observation issued in International Patent Application No. PCT/JP2013/071077.
Nov. 19, 2013 Search Report issued in International Application No. PCT/JP2013/071077.
Nov. 19, 2013 Written Opinion issued in International Application No. PCT/JP2013/071077.
Sep. 2, 2015 Extended Search Report issued in European Patent Application No. 13825675.5.
Feb. 12, 2015 European Third Party Observation issued in International Application No. PCT/JP2013/071077.
Feb. 12, 2015 Third Party Observation issued in International Patent Application No. PCT/2013/071077.
Nov. 18, 2014 Third Party Observation issued in European Application No. 13825675.5.
Apr. 7, 2015 Third Party Observation issued in Japanese Application No. 2014-506648.
Aug. 3, 2016 Office Action issued in Chinese Application No. 201380003319.3.
Asahi Kasei Amidas Corporation et al., Plastic Data Book, Selected sections of p. 490 and 848, 1999, Kogyo Chosakai Publishing Co., Ltd.†
Shogo Sakakura, JIS T 7330 The Vocabulary of Spectacle Lenses, Selected sections of p. 12 and 18, 2001, Japanese Standards Association.†
Shunji Uchio, Practical Plastic Lenses, Selected sections of p. 72, and 73, 1989, Nikkan Kogyo Shimbun, LTD.†

\* cited by examiner
† cited by third party (A)

(B)

(C)

(A)

(B)

POLARIZING LENS AND METHOD OF MANUFACTURING THE SAME

CROSS-REFERENCE TO RELATED APPLICATIONS

This application claims the benefit of priority to Japanese Patent Application No. 2012-172255 filed on Aug. 2, 2012, which is expressly incorporated herein by reference in its entirety.

TECHNICAL FIELD

The present invention relates to a polarizing lens and to a method of manufacturing the same. More particularly, the present invention relates to a polarizing lens that is molded with a polarizing film sandwiched within the lens, and to a method of manufacturing the same.

BACKGROUND ART

Conventionally, polarizing plastic lenses that block light that is polarized in a specific direction, such as light reflecting off the surface of water, are known (for example, see the following documents, the contents of which are expressly incorporated herein by reference in their entirety).
Document 1: Japanese Unexamined Patent Publication (KOKAI) No. 2007-316595 or English language family member US2009/091825A1
Document 2: Japanese Translated PCT Patent Application Publication (TOKUHYO) No. 2007-523768 or English language family members US2007/098999A1 and U.S. Pat. No. 7,767,304.

The polarizing lenses described in Documents 1 and 2 are polarizing lenses that are manufactured by embedding a polarizing film within the lens and casting a curable composition around the polarizing film, which is then cured by heating (also referred to hereinafter as the cast polymerization method or casting method).

In the polarizing lens prepared by the manufacturing method set forth above, astigmatism is sometimes produced by deformation of the lens. That is because heating during the manufacturing process deforms the polarizing film embedded within the lens. Due to this deformation, the shape of the lens surface changes. Eyeglass wearers who observe an object through an eyeglass lens that has developed astigmatism sense wear discomfort (blurring and the like) due to the astigmatism. Thus, the astigmatism should be prevented or reduced in order to provide an eyeglass lens affording a good wearing sensation.

An aspect of the present invention provides for a means for obtaining a polarizing lens with little astigmatism by inhibiting deformation of the polarizing lens within which the polarizing film is embedded.

An aspect of the present invention relates to a method of manufacturing a polarizing lens, which comprises:
conducting curved surface processing to change a shape of a polarizing film into a shape of a curved surface;
conducting heat treatment by heating the polarizing film that has been processed into a curved surface to a heating temperature of equal to or higher than 105° C. but less than 150° C.;
assembling an upper mold, a lower mold, and a seal member to provide a casting mold having a cavity within which the polarizing film following the heating treatment is positioned, the upper mold and the lower mold being positioned opposite each other so as to sandwich the polarizing film at a space therebetween, and the seal member sealing the space between the upper mold and the lower mold;
casting a curable composition into the cavity;
curing the curable composition to provide a polarizing lens within which a polarizing film is positioned; and
separating the polarizing lens thus provided from the casting mold.

Documents 1 and 2 above disclose that the polarizing film is processed into a curved surface before positioning the polarizing film within the casting mold to obtain a polarizing lens within which a polarizing film is embedded. In Document 1, it is disclosed that the polarizing film is heated to process it into a curved surface. In Document 2, it is disclosed that the polarizing film is dried at a prescribed temperature. However, in these documents, there is no disclosure that the polarizing film should be heated following processing into a curved surface.

By contrast, in the above manufacturing method, the polarizing film following curved surface processing is heated to a heating temperature of equal to or higher than 105° C. but less than 150° C. before being positioned within the casting mold. Such heating can predeform (shrink) the polarizing film that has been curved surface processed prior to positioning it within the casting mold. It is presumed that, during subsequent processing, shrinkage that would deform the surface shape of the lens is either not induced or the degree of shrinkage is small. The present inventors presume that this is why the above manufacturing method can provide a polarizing lens with little astigmatism. In the present invention, the "upper mold" refers to a mold having a molding surface for molding the object-side surface of the eyeglass lens. Normally, the molding surface is a concave surface for forming a convex surface. The "lower mold" is a mold having a molding surface for forming the eyeball-side surface of the eyeglass lens. Normally, the molding surface is a convex surface for molding a concave surface. The "object-side surface" of the lens means the surface constituting the lens that is on the side of the object that is visually recognized when the lens is worn as an eyeglass. The "eyeball-side surface" of the lens means that surface constituting the lens that is on the side of the eyeball of the wearer when the lens is worn as an eyeglass.

In an embodiment, the above manufacturing method comprises moistening the polarizing film prior to the curved surface processing.

In an embodiment, in the above manufacturing method, the polarizing film prior to curved surface processing is moistened while being heated, cooled, and then curved surface processed.

In an embodiment, the above cooling is conducted by placing the moistened polarizing film at room temperature.

In an embodiment, the above manufacturing method comprises positioning the polarizing film in the above assembling of the casting mold such that the minimum distance between the inner surface on the cavity side of the upper mold and the polarizing film is equal to or more than 0.3 mm and equal to or less than 0.7 mm.

The polarizing lens prepared by using the casting mold assembled as set forth above comprises:
a first lens substrate having an object-side surface;
a second lens substrate having an eyeball-side surface; and
a polarizing film, positioned between the first lens substrate and the second lens substrate, such that a minimum distance between the polarizing film and the object-side surface is equal to or more than 0.3 ram and equal to or less than 0.7 mm.

The polarizing lens with the above structure is useful as a semifinished lens. This point will be described in greater detail below.

Eyeglass lenses are normally roughly classified into finished lenses and semifinished lenses. A finished lens means a lens in which the refractive surface (normally, a convex surface) on the object side of the lens and the refractive surface (normally, a concave surface) on the eyeball side are both mirror-finished optical surfaces that satisfy the prescription lens power, and in which there is no need for the curved surface processing of an optical surface. Finished lenses include lenses that have been subjected to edging, and lenses that have not yet been subjected to edging.

A semifinished lens (also referred to as a "semi-lens", hereinafter) has a meniscus shape in which one of the surfaces is normally convex and the other surface is of a concave, but without a vision-correcting function. Just the convex surface of the lens is an optical surface that has been processed to a mirror surface; the concave surface is an unprocessed surface. The design of the lens thickness leaves a machining allowance for removal by processing so that the lens manufacturer, in response to the lens prescription power, can process (including grinding, curve-generating, and polishing) the surface on the concave side to finish a lens with a vision-correcting function. In the present invention, the above-described finished and semifinished lenses are defined as eyeglass lenses. That is, eyeglass lenses include finished lenses, which are lenses having a vision-correcting function that optically satisfies a prescription power, as well as semifinished lenses, which are processed into lenses having a vision-correcting function that optically satisfies a prescription power.

When the above polarizing lens within which a polarizing film is embedded is a semifinished lens, the maximum value of the machining allowance for processing such that the polarizing film is not exposed or eliminated is determined by the distance between the polarizing film and the concave surface (the surface that is surface processed to function as the refractive eyeball-side surface). The closer the polarizing film approaches to the concave surface, the smaller the machining allowance becomes. Accordingly, the lens that is obtained following surface processing ends up being thick. Generally, the thickness of a normal finished lens that doesn't include a polarizing film is about 1.1 mm at its thinnest point. In a polarizing lens (semifinished lens) in which the minimum distance from the object-side surface is equal to or less than 0.7 mm, by envisioning surface processing to the processing limit, an eyeglass lens in which the thickness at the thinnest spot is about 1.1 mm can be provided by surface processing the concave surface. Additionally, if the minimum distance between the object-side surface and the polarizing film is made equal to or more than 0.3 mm, the forming of the eyeball-side surface is facilitated during manufacturing.

As set forth above, a polarizing lens comprising a first lens substrate having an object-side surface; a second lens substrate having an eyeball-side surface; and a polarizing film, positioned between the first lens substrate and the second lens substrate, such that the minimum distance between it and the object-side surface is equal to or more than 0.3 mm and equal to or less than 0.7 mm, is useful as a semifinished lens for obtaining a polarizing lens (finished lens) comprising a polarizing film within the lens.

In an embodiment, the above manufacturing method comprises, in the assembly of the above casting mold, adhering with an adhesive the perimeter portion of the inner surface on the cavity side of the upper mold and the perimeter portion of the polarizing film at two or more points.

This point will be described in greater detail.

In the manufacturing by the cast polymerization method of a polarizing lens in which a polarizing film is embedded, in the methods described in above Documents 1 and 2, a gasket is employed as a material for sealing off the cavity of the casting mold and a mounting part provided on the gasket is used to position the polarizing film. However, in such methods, irrespective of the thickness and shape difference (curved surface precision) of the polarizing film, the holding position of the polarizing film ends up being determined by the gasket design and manufacturing precision. As a result, the position of the polarizing film following molding ends up fluctuating. Thus, it becomes necessary to mold the lens to a thickness that takes this fluctuation into account. The lens ends up being thicker than an ordinary eyeglass lens (an eyeglass lens that doesn't include a polarizing film). By contrast, based on the method of adhering the upper mold to the polarizing film with the adhesive, based on the amount of adhesive applied (the height of the adhesive column), the distance between the inner surface of the upper mold and the polarizing film, that is, the distance between the polarizing film and the object-side surface of the lens that is obtained by cast polymerization, can be freely set. Thus, it becomes possible to resolve the above-described problems occurring in methods employing gaskets.

In an embodiment, the above seal member is a tape having an adhesive layer.

When a tape is employed as a material for sealing off the cavity of the casting mold, it is difficult to provide a polarizing film-positioning part such as a gasket. Thus, when manufacturing a polarizing lens by cast polymerization, a gasket is normally employed. By contrast, based on the method of adhering the upper mold and the polarizing film by means of the adhesive, it is possible to position and hold the polarizing film within the cavity of the coasting mold without using a gasket having a mounting part for positioning and holding the polarizing film. Accordingly, when manufacturing a polarizing film by cast polymerization, a tape, a simple and inexpensive material, can be employed.

In an embodiment, in the above manufacturing method, the curved surface processing is conducted by pressing down with the polarizing film positioned on the convex surface mold to transfer the convex surface shape to the polarizing film.

In an embodiment, the above heat treatment is conducted with the polarizing film positioned on the convex surface mold following the above pressing, without removing it from the convex surface mold.

In an embodiment, the heating temperature is equal to or higher than 120° C. but less than 150° C.

In an embodiment, the above manufacturing method comprises coating a heat-curable composition on the polarizing lens that has been separated from the casting mold and then conducting heating to form a cured coating.

A further aspect of the present invention relates to a polarizing lens comprising:

a first lens substrate having an object-side surface;

a second lens substrate having an eyeball-side surface; and a polarizing film, positioned between the first lens substrate and the second lens substrate, such that the minimum distance between it and the object-side surface is equal to or more than 0.3 mm and equal to or less than 0.7 mm;

in which that the difference (Rmax−Rmin) between the maximum radius of curvature Rmax and the minimum radius of curvature Rmin at the geometric center of the object-side surface is less than 4 mm.

The above polarizing lens will be further described below.

It is already described above that the polarizing lens is desirably a semifinished lens in which the minimum distance between the object-side surface and the polarizing film is equal to or more than 0.3 mm and equal to or less than 0.7 mm. In a polarizing lens in which the polarizing film is positioned relatively close to the object-side surface in this manner, the tendency for the object-side surface to be deformed due to deformation of the polarizing film is strong. However, such deformation may cause the above-mentioned astigmatism. By contrast, based on the present invention as set forth above, it is possible to prevent the surface shape of the object-side surface from changing due to deformation of the polarizing film. The difference (Rmax−Rmin) between the maximum radius of curvature Rmax and the minimum radius of curvature Rmin at the geometric center of the object-side surface can be used as an indicator that no deformation has occurred. So long as the value thereof is less than 4 mm, the eyeglass lens can be considered to be one for which an eyeglass wearer will sense no (or few) use defects due to astigmatism. The polarizing lens according to an aspect of the present invention can be employed as an eyeglass lens producing such a good sensation when worn.

A further aspect of the present invention relates to a method of manufacturing a polarizing lens comprising:

assembling an upper mold, a lower mold, and a seal member to provide a casting mold having a cavity within which the polarizing film is disposed, the upper mold and the lower mold being positioned opposite each other so as to sandwich the polarizing film at a space therebetween, and the seal member sealing the space between the upper mold and the lower mold, with the maximum diameter of the polarizing film being the same or smaller than the maximum diameter of the inner surface on the cavity side of the upper mold, and with the perimeter portion of the inner surface on the cavity side of the upper mold being adhered by means of adhesive to the perimeter portion of the polarizing film at two or more points;

casting a curable composition into the cavity;

heat curing the curable composition to provide a polarizing lens within which a polarizing film is positioned; and separating the polarizing lens thus provided from the casting mold.

By assembling a casting mold in this manner and casting a curable composition (also referred to hereinafter as a "lens monomer," which can also contain various curable components such as oligomers and prepolymers in addition to monomers) into the cavity, the lens monomer surrounds the polymerizing film within the cavity on two sides, thereby permitting the smooth injection of lens monomer into the cavity.

In an embodiment, the adhesive is solidified in columnar form so as to have a certain height and support the polarizing film.

In an embodiment, the seal member is a tape having an adhesive layer.

In an embodiment of the various embodiments set forth above, the curable composition is a thiourethane or thioepoxy resin.

In an another embodiment, the adhesive is positioned in spots that are removed during mounting of the lens into an eyeglass frame.

The present invention can provide a polarizing lens within which a polarizing film is positioned, with little deformation on the object-side surface. The polarizing lens that is provided in this manner is useful as a semifinished lens.

MODES FOR CARRYING OUT THE INVENTION

An aspect of the present invention relates to a method of manufacturing a polarizing lens, which comprises:

conducting curved surface processing to change a shape of a polarizing film into a shape of a curved surface;

conducting heat treatment by heating the polarizing film that has been processed into a curved surface to a heating temperature of equal to or higher than 105° C. but less than 150° C.;

assembling an upper mold, a lower mold, and a seal member to provide a casting mold having a cavity within which the polarizing film following the heating treatment is positioned, the upper mold and the lower mold being positioned opposite each other so as to sandwich the polarizing film at a space therebetween, and the seal member sealing the space between the upper mold and the lower mold;

casting a curable composition into the cavity;

curing the curable composition to provide a polarizing lens within which a polarizing film is positioned; and separating the polarizing lens thus provided from the casting mold.

The above manufacturing method will be described in greater detail below.

Figure 1:
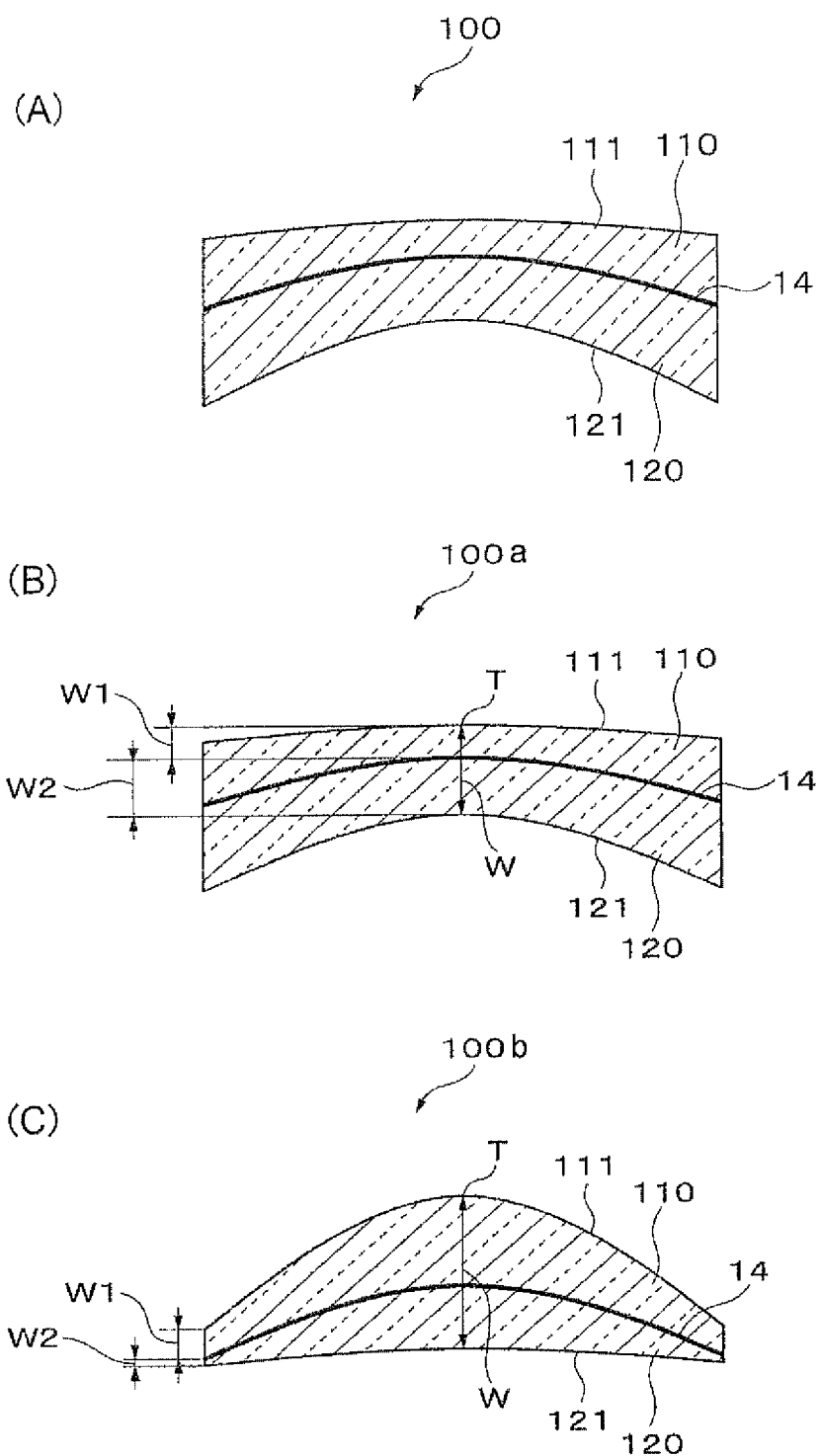
FIG. 1 A sectional view of a polarizing lens according to an embodiment of the present invention.

FIG. 1 is a sectional view of a polarizing lens according to an embodiment of the present invention.

As shown in FIG. 1 (A), the polarizing lens 100 of the present embodiment is a plastic lens, meniscus in form, that is comprised of a first lens element 110, a second lens element 120, and a polarizing film 14 that has been processed into a curved surface, between the two lens elements. First lens element 110 is positioned on the object side (convex side) of lens 100a relative to the polarizing film 14. Second lens element 120 is positioned on the eyeball side (concave side) of lens 100. First lens element 110 and second lens element 120 are both meniscus in form. In first lens element 110, the convex side is the convex portion of lens 100 and the concave side is the surface coming into contact with polarizing film 14. Similarly, in second lens element 120, the concave side is the concave portion of lens 100 and the concave side is the surface coming into contact with polarizing film 14.

For example, a polarizing film, obtained by press molding a commercial iodine polarizing film in curved surface processing to a prescribed curvature corresponding to the shape of the lens, and cutting the external shape to a circular shape, can be used as polarizing film 14 embedded in polarizing lens 100. The details of the curved surface processing will be described further below.

As shown in FIG. 1(B) and FIG. 1(C), the minimum distance between the convex side 111 of lenses 100a and 100b and polarizing film 14, as stated above, is desirably designed to be equal to or more than 0.3 min and equal to or less than 0.7 mm.

In lens 100a shown in FIG. 1(B), the base curve is 2 D (diopters), the curvature of polarizing film 14 is 3 D, making it a single-vision lens with a negative prescription power. In the case of a lens of negative prescription power, the lens increases in thickness as one moves from the center toward the perimeter. The reverse holds true for a lens of positive prescription power.

In lens 100a in FIG. 1(B), the top T of the center of lens convex surface side 111 is the point of the minimum distance W1 from polarizing film 14. The distance between top T and polarizing film 14 is equal to or more than 0.3 mm and equal to or less than 0.7 mm.

Top T is the geometric center, as well as the optical center, in the case of a spherical design.

Lens 100b shown in FIG. 1(C) is a single-vision lens with a positive prescription power in which the base curve is 10 D and the curvature of polarizing film 14 is 8 D.

Distance W1 is the minimum region between polarizing film 14 and the lens top, and the distance between the outer perimeter and polarizing film 14 is equal to or more than 0.3 mm and equal to or less than 0.7 mm.

As shown in FIG. 1, in a polarizing lens of a type where a polarizing film is sandwiched between two lens substrates, the design of the refractive surface of convex side 111 of the lens of first lens element 110 is desirably that of a rotationally symmetric surface, preferably a spherical surface. This is to facilitate mold manufacturing and the creation of the curved surface of the polarizing film.

Based on the present embodiment, by using a highly refractive lens monomer with a refractive index of equal to or higher than 1.60 and setting the difference between the polarizing film and the lens convex surface curve to equal to or less than 2 D, the minimum value of the clearance H, which is the distance between the convex surface of the lens and the polarizing film, can be set to equal to or more than 0.3 mm and equal to or less than 0.7 mm. As a result, it is possible to obtain a polarizing lens with a minimum lens thickness of 1.1 mm.

The above manufacturing method can be used to manufacture a polarizing lens by cast polymerization (casting). The casting method is a molding method in which a lens monomer is cured by polymerization within a cavity formed with an upper mold, a lower mold, and a seal member adjusting the distance between the upper and lower molds and determining the thickness of the lens; and the molds are separated to remove the lens.

The upper and lower molds are also referred to as the master mold. The material employed in them can be glass, ceramic, metal, resin, or the like. Normally, chemically strengthened glass is employed.

In the upper mold, the inner surface (molding surface) positioned on the cavity side is normally concave. By transferring the surface shape of this concave surface, the convex refractive surface of the lens that is obtained by polymerization curing is formed. When the upper mold is a glass mold, the molding surface of the upper mold is normally processed as a mirror surface by rough grinding, sanding, polishing, or the like.

Additionally, the molding surface of the lower mold is normally a convex surface. The convex shape of this convex surface is transferred to form the concave refractive surface of the lens that is obtained by polymerization curing. The lower mold is also normally processed in the same manner as the upper mold.

Gaskets and tape (referred to as "adhesive tape", hereinafter) with an adhesive layer on one side can be employed as the seal member. When a gasket is employed, the upper and lower molds are normally clamped together with a clamp comprising an elastic member such as a spring to secure them. However, the method of securing will vary with the shape of the gasket and is not limited thereto. Additionally, in the case of an adhesive tape, no clamp is generally needed. Accordingly, the use of a clamp is optional.

The base material employed in the adhesive tape can be in the form of polyester such as polyethylene terephthalate, polyolefin such as polypropylene, polystyrene, ABS, other polystyrenes, polyimides, acetate, paper, cloth, metals, and the like. Of these, the use of polyethylene terephthalate or polypropylene is desirable. The adhesive tape can be in form of a tape or ribbon, or can be in a form that can be wound around the mold. The thickness of the adhesive tape is normally desirably less than 200 μm. The thickness of the adhesive tape is not specifically limited, and need only be such that buckling does not occur in the course of assembling the casting mold.

Silicone, acrylic, natural rubber, or similar adhesive can be employed as the adhesive of the adhesive tape. From the perspective of performance such as melting into the curable composition and heat resistance, a silicone-based adhesive comprising a silicone rubber component and a silicone resin component as adhesive components is desirably employed. When winding an adhesive tape onto the upper and lower molds to form the cavity, for example, the use of a mold casting assembly device equipped with the following measurement mechanism and drive mechanism permits assembly of the casting mold with good precision.

The device has a structure comprising:

a holding means for holding the nonmolding surfaces of the various casting molds;

a measuring means for measuring the height of the center portion of the molding surfaces of the various casting molds relative to a predetermined reference position;

a conveying means for advancing the center of each casting mold in a coaxial manner;

a measuring means for measuring the distance between the molding surfaces in the perimeter portions of the casting molds;

a determining means for comparing the value measured by the measuring means with the total amount of displacement of each mold until the distance between the centers of the molding surfaces of the upper and lower molds reaches a prescribed distance from a measured position;

a conveying means displacing each of the molds so that the center distance between the molding surfaces of the upper and lower molds reaches a prescribed distance; and an adhesive tape winding means for winding the adhesive tape on the circumferential surfaces of the upper and lower molds to form a cavity.

The various assembly methods that are employed in the cast polymerization of plastic lenses for eyeglasses can be adopted to assemble a casting mold employing adhesive tape. In that regard, reference can be made to, for example, Japanese Unexamined Patent Publication (KOKAI) No. 2001-330806, which is expressly incorporated herein by reference in its entirety.

As set forth above, in cast polymerization employing a gasket, the positioning of the polarizing film is determined and held by mounting parts provided on the gasket. By contrast, the method of adhering the inner surface of the upper mold and the polarizing film at two or more points by means of adhesive makes it possible to freely set the distance between the object-side surface of the lens obtained and the polarizing film. This method allows the use of tape as a seal member and can yield a polarizing lens in which a polarizing film is positioned at a desired location within the lens.

The above method using adhesive holds the polarizing film while maintaining a prescribed spacing (referred to hereinafter as "clearance") without the surface of the polarizing film coming into contact with the inner surface of the upper mold. The adhesive is desirably positioned on the perimeter portion of the surface of the polarizing film or on the perimeter portion of the inner surface of the upper mold in column (rod, square bar, or the like) or block form, preferably column form. The adhesive is not placed completely around the perimeter of the surface of the polarizing film or completely around the perimeter of the upper mold in the form of a band. This is because, were the adhesive to be applied in such a manner, it would be impossible to cast the curable composition between the upper mold and the polarizing film in the casting mold.

Specific embodiments of carrying out the method of manufacturing a polarizing lens of an aspect of the present invention will be described next with reference to the drawings.

Figure 2:
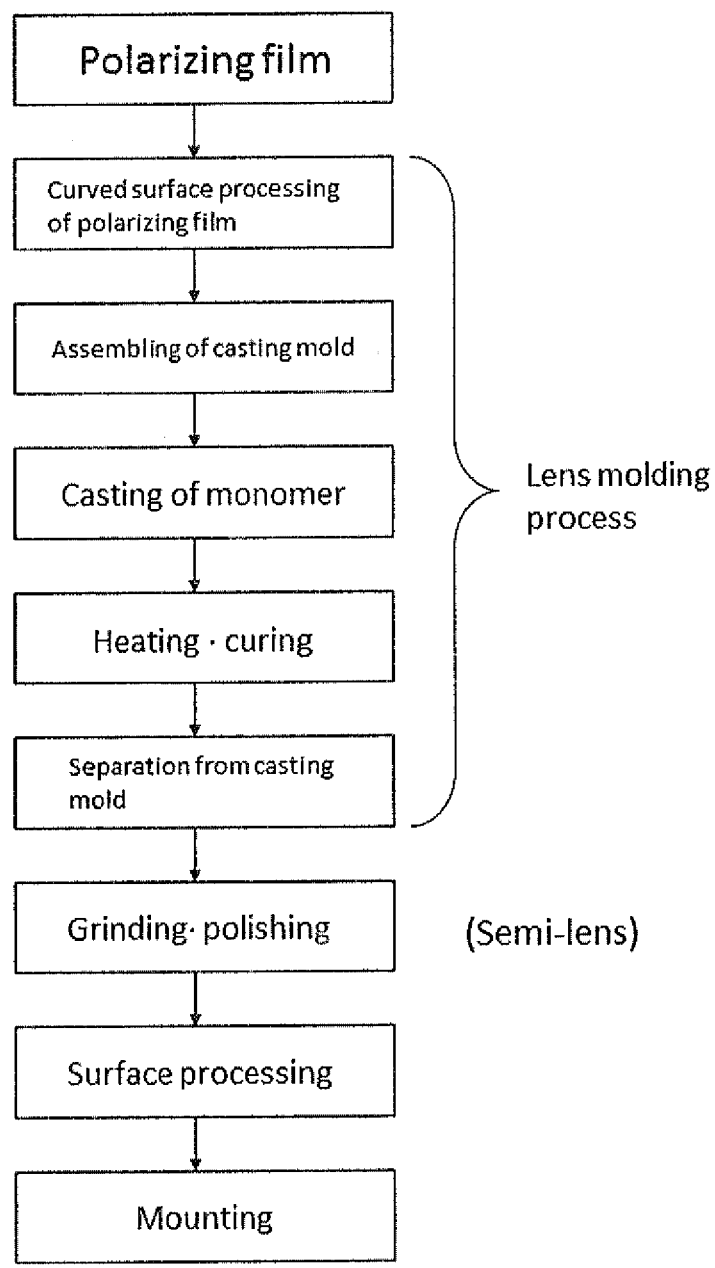
FIG. 2 A flowchart of a method of manufacturing the polarizing lens according to an embodiment of the present invention.

FIG. 2 is a flowchart providing a summary of the steps of manufacturing the polarizing lens of the present embodiment. It comprises a step of conducting curved surface processing of the polarizing film; a step of assembling a casting mold by incorporating the polarizing film into the upper and lower glass molds; a step of casting a lens monomer into the cavity of the casting mold, a step of heating and polymerizing a lens monomer that has been cast into the casting mold, and a step of separating from the casting mold the lens that has been cured and molded in the polymerization step. When manufacturing a semi-lens, the concave surface (eyeball-side surface) of the lens following mold separation is surface processed according to a prescription (by at least one from among grinding (rough grinding, sanding), curve-generating, or polishing).

Subsequently, prior to fabricating eyeglasses, surface processing (coating and the like) is optionally conducted. The eyeglass lens thus obtained can be suitably subjected to processes such as edging to the shape of a desired frame and mounting.

(Polarizing Film)

Figure 3:
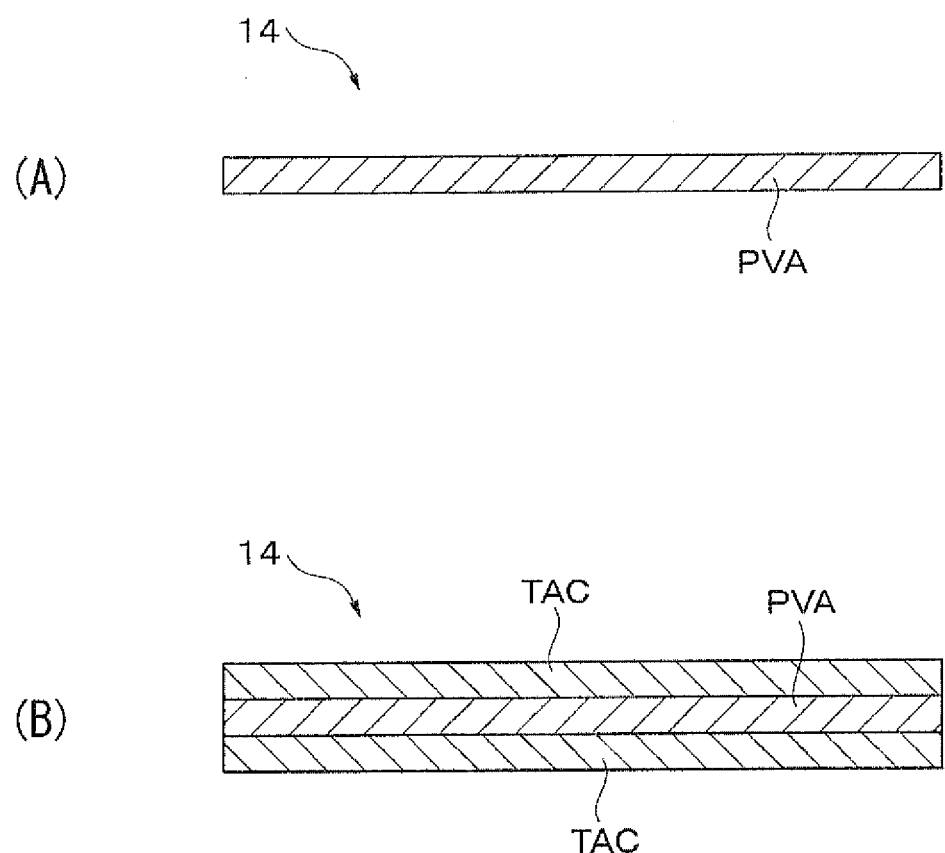
FIGS. 3 (A) and (B) are sectional views of a polarizing film employed in a polarizing lens according to an embodiment of the present invention.

FIG. 3 shows a sectional view of polarizing film 14.

Polarizing film 14 is not specifically limited other than that it performs a polarizing function. As shown in FIGS. 3(A) and 3(B), a film of a single layer (FIG. 3(A)) or multiple layers (FIG. 3(B)) including a resin layer comprised of polyvinyl alcohol (PVA) is desirable. PVA is desirable as a film material due to good transparence, heat resistance, affinity with dyes such as iodine and dichroic dyes, and orientation properties when stretched.

A multilayered polarizing film 14 can be obtained by impregnating PVA with iodine, molding the product into a film, stretching it along one axis to form a resin layer, and then laminating a protective layer in the form of a triacetyl cellulose (TAC) on both surfaces, as shown in FIG. 3(B).

The thickness of polarizing film 14 is not specifically limited other than that it permits processing of the film into a curved surface. For example, in the case of a common commercial film, about 10 µm to 500 µm is desirable. When the thickness is equal to or more than 10 µm, rigidity is good and handling is facilitated. At equal to or less than 500 µm, processing of the film into a curved surface is facilitated.

(Processing the Polarizing Film into a Curved Surface)

The polarizing film is desirably processed into a curved surface by causing it to conform to the shape of the molding surface (normally, a concave surface) of the upper mold.

The processing of the polarizing film into a curved surface can be done by any method so long as the film shape becomes the desired curved surface shape. An example of a desirable method is the press molding method. For example, the polarizing film can be positioned on the convex surface mold and pressed to transfer the convex shape to the polarizing film and obtain a polarizing film with a curved surface shape. For example, a polarizing film in the form of a flat sheet can be sandwiched in a pressing mold comprising a pair of forming molds (master molds) in the form of a male mold and a female mold equipped with a temperature adjusting means (heater, coolant, or the like) and a pressing means, and pressed to process the polarizing film into the curved surface shape of the molding surface. The polarizing film will normally be a thin, flat sheet of resin. A male mold and a female mold with spherical molding surfaces are desirably employed. Since a spherical molding surface is not complex in shape, it does not require a special press device, permitting the use of an ordinary pressing molding device to readily achieve curving.

FIG. 4(A) is a drawing showing the curved surface processing mount of a male mold. Numeral 10 denotes a flat film member, and numeral 60 denotes a curved surface processing mount. Curved surface processing mount 60 includes a heat resistant ceramic processing base member 60a and a master mold 61 (61a, 61b) in the form of glass molds with spherical surfaces. In the drawing, two master molds 61 are shown. However, since it is made for right and left eyeglass lenses, it can be singular or plural in number.

The curvature of the curved surface of master mold 61 is set based on the base curve of the refractive surface on the convex side of the lens 100 (see FIG. 1) that is being manufactured. For example, the greater the base curve is, the greater the curvature of the curved surface of master mold 61 can be. The curvature of the curved surface can be formed to be identical to the curvature of the base curve of lens 100, or can be different from the base curve of plastic lens 100 to the extent that grinding and/or polishing of the concave surface are possible in the case of a semifinished lens. When the prescription lens is a progressive addition lens, an aspherical lens, or the like with a surface shape other than spherical, the curved surface can have a surface shape that confirms to the surface shape of the finished lens. In the present embodiment, the magnitude of the base curve is divided into several stages, with a curved surface with a different curvature being set for each stage. That is, normally, as one design item of an eyeglass lens, the scope of power being fabricated is set from a positive power (for hyperopia) to negative power (myopia). Thus, there are at least five types of base curves to correspond to this range of powers. This is done in an effort to be able to handle orders for such lens items.

Figure 4:
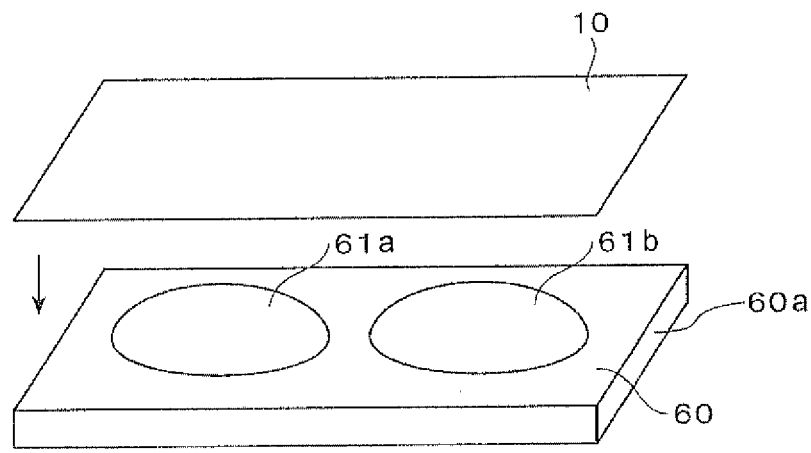
FIGS. 4 (A), (B), and (C) are drawings showing the curved surface processing of a polarizing film according to an embodiment of the present invention.
Figure 4:
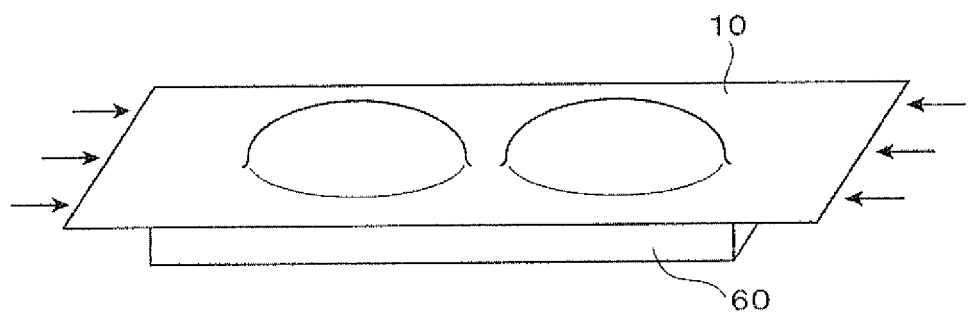
Figure 4:
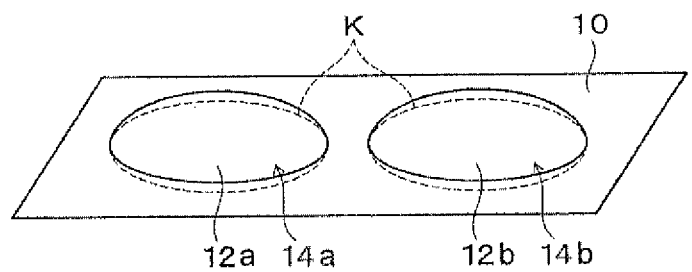

When a uniaxially stretched PVA film is cut into a rectangular shape to obtain a flat film member 10 that is placed on the male master mold portion and pressed at room temperature (about 20 to 25° C.) for example with a pressing means having a female master mold portion, not shown, to transfer the shape of a curved surface 12 (12a, 12h) to the polarizing film, the curved surface processing of polarizing film 14 (14a, 14b) is conducted (see (B) and (C) in FIG. 4).

Prior to conducting the curved surface processing set forth above, the polarizing film is desirably moistened. This can enhance the transferability of the shape to the master mold. The moistening treatment can be conducted by a method such as placing the polarizing film in a constant humidity, high-temperature device for a prescribed period, spraying the polarizing film with a mist of water, and the like. However, the method is not specifically limited so long as it allows an increase in the water content. The moistening is normally conducted in a heated atmosphere at about 50 to 90° C.

In order to process the moisturized polarizing film into a curved surface in a state where the film retains most of the water it has absorbed, cooling is desirable. For example, a polarizing film that has been removed from a constant humidity, high-temperature device can be left standing at room temperature (about 20 to 25° C.) to cool it.

In the manufacturing method according to an aspect of the present invention, the polarizing film following curved surface processing is heated to a heating temperature of equal to or higher than 105° C. but less than 150° C. In the present invention, the term "heating temperature" means the atmospheric temperature at which the heat treatment is conducted. As set forth above, the polarizing film that has been processed to impart a curved surface can be heated prior to being placed in the pressing mold to prevent a change in the polarizing film. As a result, deformation of the surface of the polarizing lens, particularly the object-side surface, can be prevented. In this context, the use of a heating temperature of equal to or higher than 105° C. can prevent deformation well. The use of a heating temperature of less than 150° C. can prevent the generation of discoloration and/or distortion in the polarizing film. The heating temperature is desirably equal to or higher than 120° C., and desirably equal to or lower than 130°. The heat treatment can be conducted in the atmosphere.

Various methods can be adopted as the heating method. In one embodiment, the polarizing film is placed in a hot air circulating oven that has been heated to the above temperature, and brought into contact with hot air. The heating period is not specifically limited. It suffices to conduct heating until the polarizing film has adequately shrunk.

The polarizing film can be removed from the mold in which the curved surface processing has been conducted and subjected to the heat treatment, or can be heat treated while still positioned within the mold. In one desirable embodiment, as shown in FIG. 4, the film member 10 is heated as is, without separating glass mold 60 and film member 10 following curved surface processing. That is, the polarizing film that has been curved surface processed (film member 10) is held by the curved surface 61 of glass mold 60 and heated. A uniaxially stretched polarizing film will shrink different amounts in different directions. Thus, the shape of curved surface 12 will sometimes end up changing from the set shape. By contrast, when held by the curved surface 61 of glass mold 60, film member 10 can shrink along the shape of curved surface 61 of glass mold 60. Thus, relative to the case where heating is conducted without employing glass mold 60, the curvature and shape of curved surface 12 can be more precisely molded. The polarizing film can be placed on a convex mold other than the mold employed in curved surface processing and heat treated. That is, the film member 10 that has been curved surface processed can be separated from glass mold 60 and placed on a glass mold 60 for heating that has been separately prepared. In terms of processing efficiency and to ensure precision, it is desirable to employ the glass mold 60 that has been employed in curved surface processing.

Figure 6:
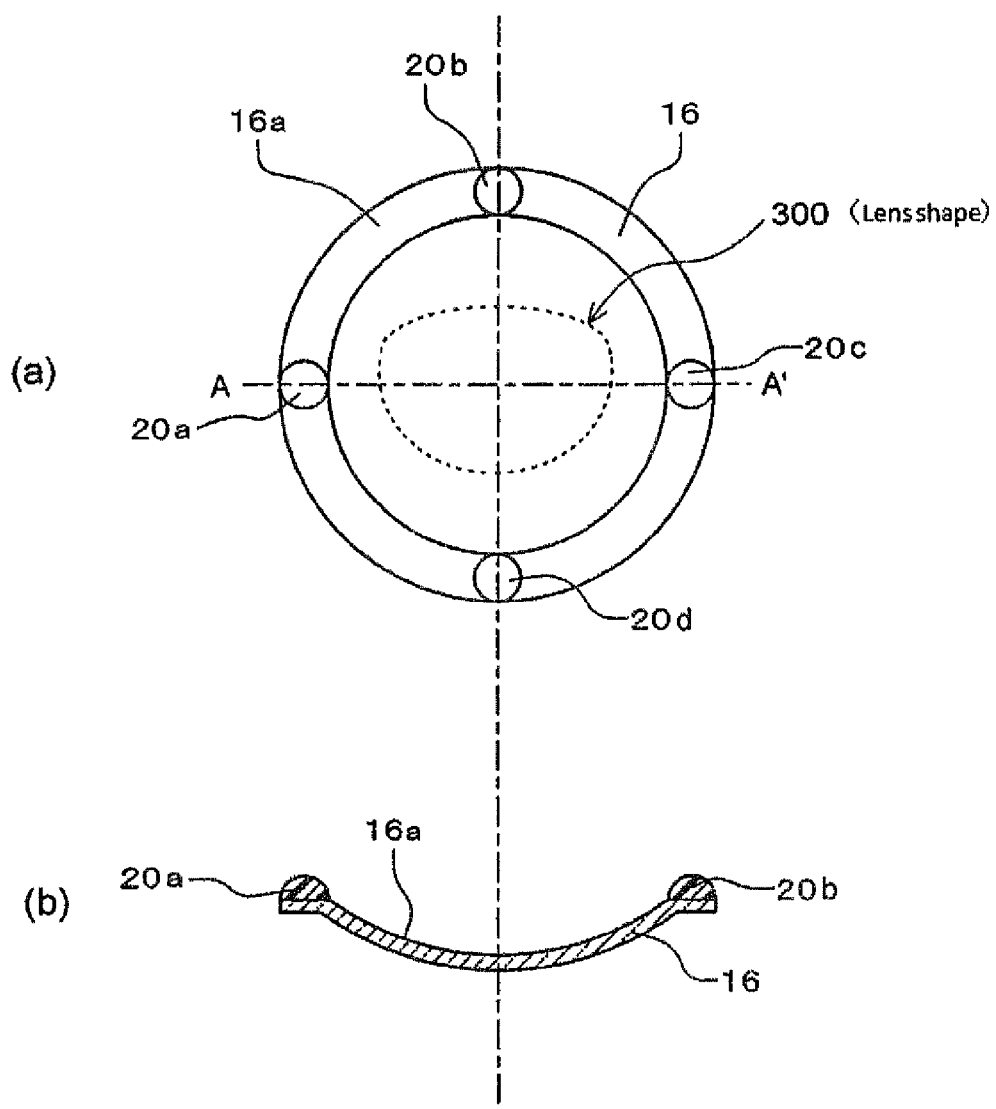
FIG. 6 A drawing showing the positioning of adhesive on upper mold 16 according to an embodiment of the present invention; (a) is a plan view and (b) is a sectional view along section line A-A'.

Next, as shown in FIG. 4(C), to cause the film member to be retained on upper mold 16, while causing film member 10 to correspond to the mold shape and leaving it around the various curved surface portions 61a, the film member is cut along dotted line K in the drawing. The cut polarizing film is imparted with a flange portion. In one embodiment, as shown in FIG. 6 (the details of which will be given further below), upper mold 16 has a flat flange 16a on the lens flange. The flange portion is formed to facilitate retention of the polarizing film by the upper mold. However, the flange portion is not necessary. Even without a flange portion, the polarizing film can be held.

Next, the polarizing film 14 that has been curved surface processed is retained on upper mold 16. The process of forming the upper mold structure will be described.

Figure 5:
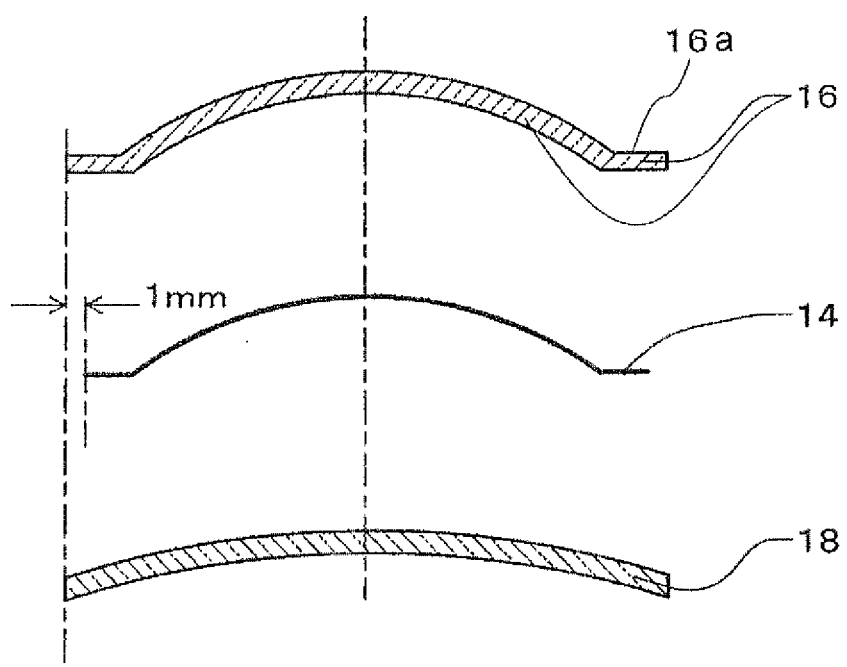
FIG. 5 A drawing describing the relation between upper mold 16 and lower mold 18 and the polarizing film according to an embodiment of the present invention.

FIG. 5 is a drawing comparing the shapes of upper mold 16, the polarizing film, and lower mold 18.

In an embodiment shown in FIG. 5, the diameter (inner diameter) of polarizing film 14 is about 2 mm smaller than the inner diameter of upper mold 16 and lower mold 18. Thus, in the step of casting monomer that is described further below, when casting lens monomer into the cavity between upper mold 16 and lower mold 18, it becomes possible for monomer to surround polarizing film 14 on both sides, and monomer can be smoothly cast into the cavity. However, there are various methods of casting into the cavity. Thus, the inner diameter of the polarizing film need not necessarily be smaller than the inner diameter of the mold. It suffices, when forming the cavity, for it not to get in the way when sealing the side surfaces with the seal member.

FIG. 6 shows the state of formation of support member 20 comprised of adhesive for holding the polarizing film in upper mold 16. FIG. 6(a) is a plan view and FIG. 6(b) is a section view along section line A-A'.

In FIG. 6(a), holding members 20a, 20b, 20c, and 20d are positioned to hold the polarizing film in four spots at intervals of 90° in flange 16a in the inner surface of upper mold 16. The holding members are formed of adhesive columns (adhesive formed into columns of a certain height). Holding members 20a, 20b, 20c, and 20d are for adhering to and supporting the polarizing film. Thus, when the polarizing film is positioned on these holding members, the height and position of the adhesive columns is controlled so that the polarizing film can be held while maintaining a prescribed clearance (spacing) so that the polarizing film does not contact the inner surface of upper mold 16. In the drawing, numeral 300 denotes the lens shape of an eyeglass frame into which the polarizing lens is mounted. Thus, holding member 20 is cut away following mounting.

The method of shaping the adhesive in upper mold 16 will be described next.

Figure 7:
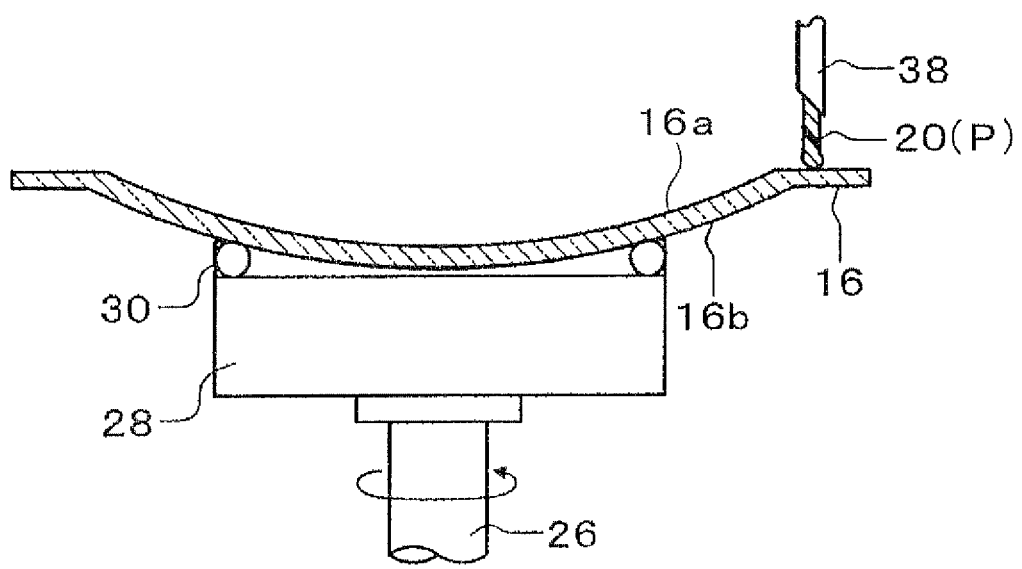
FIG. 7 A drawing descriptive of the method of forming the adhesive on upper mold 16 according to an embodiment of the present invention.
Figure 8:
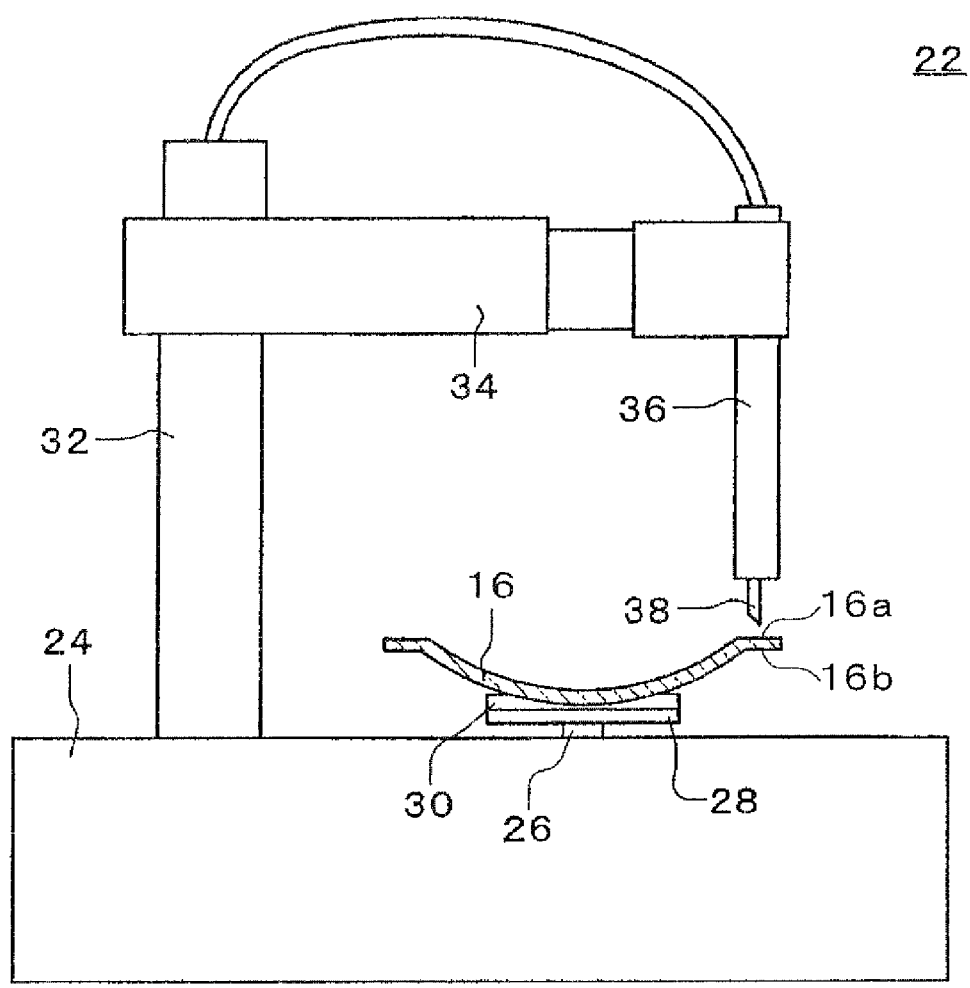
FIG. 8 An adhesive discharging device according to an embodiment of the present invention.

FIG. 7 is a drawing showing the method of applying the adhesive on upper mold 16. FIG. 8 is a drawing showing a discharge device 22 for applying adhesive. Discharge device 22 for applying adhesive will be described schematically based on FIGS. 6 and 7 below.

Discharge device 22 is equipped with a main body 24 into which is built a motor, not shown; a rotating shaft 26 protruding upward from main body 24; and a turntable 28 positioned on the upper end of rotating shaft 26. A ring-shaped, fixed pad 30 (the side surface of which is shown in the drawing) that is flexible and supports upper mold 16, is set on the upper surface of turntable 28 so that it comes into contact with upper mold 16 in the vicinity of the flange of the outer surface portion 16*b*. The reason for using a ring-shaped, fixed pad 30 is to prevent the means of securing upper mold 16 from coming into contact with the transparent surface of outer surface portion 16*b*.

A syringe 36 is mounted via a slider 34 on a rod 32 extending upward from main body 24. Syringe 36 is configured to discharge a prescribed quantity of viscous adhesive P through a front end needle 38 through the control of the pneumatic pressure by means of a dispenser in main body 24, not shown in the drawing.

A UV-curable resin (UV-curable composition) is desirably employed as adhesive P. A UV-curable composition has the property of chemically changing front a liquid to a solid in response to light energy in the form of UV radiation, as is widely known. A composition containing a UV-curable component such as a prepolymer or monomer, a photopolymerization initiator, and optional known additives can be employed as the UV-curable composition. The type of UV-curable composition is not specifically limited; a suitable one is desirably selected based on the type of the lens monomer. Due to poor reactivity with the various monomers that are employed in the manufacturing of plastic lenses, an example of a desirable UV-curable composition is a UV-curable epoxy resin.

The method of applying adhesive 20 by means of discharge device 22 will be described next schematically.

After positioning upper mold 16, adhesive is applied to upper mold 16. As shown in FIGS. 7 and 8, upper mold 16 is positioned on the fixed pad 30 of turntable 28. The position of syringe 36 is suitably adjusted, and needle 38 is positioned facing the flange of the inner surface portion 16*a* of upper mold 16. Discharge device 22 is then driven. That is, turntable 28 is rotated and upper mold 16 is turned circumferentially. When the lower part of needle 38 arrives at a predetermined upper mold 16 application position, the dispenser device is driven, causing adhesive to be discharged through the tip of needle 38 onto the flange of inner surface portion 16*a*. The spots where the adhesive is positioned (adhesive positions) are on the inner surface of the upper mold or along the rim portion the outer surface of the polarizing film. Normally, they are regions that are cut away in the course of processing to mount the lenses in eyeglass frames. Accordingly, when molded into the lens, the closer they are to the outer perimeter of the lens the better, preferably within 5 mm thereof. To horizontally support the polarizing film, the number of support points (adhesive application points) is two or more, preferably four or more, positioned opposite each other at a prescribed spacing. The more support points there are, the more stably the polarizing film can be held. The fewer such points there are, the more smoothly the lens monomer flows into the cavity through the gaps in the adhesive. To horizontally support the polarizing film, the same quantity and height of adhesive is used at each application point.

By controlling the amount of adhesive discharged, it is possible to position adhesive of nearly uniform height at each adhesion point. To horizontally hold the polarizing film, the height of the adhesive at each point is desirably identical. The height of adhesive 20 is adjusted based on the predetermined spacing of polarizing film 14 and upper mold 16. In this process, for example, the adjustment can be made by taking into account such factors as the shrinkage allowance of the adhesive, the manufacturing errors in the mold and polarizing film, and the width of the surface being adhered. For example, the height of the adhesive can be set to be somewhat greater than the clearance, the adhesive column can be slightly collapsed to achieve contact with the polarizing film, and the two can be adhered.

Figure 9:
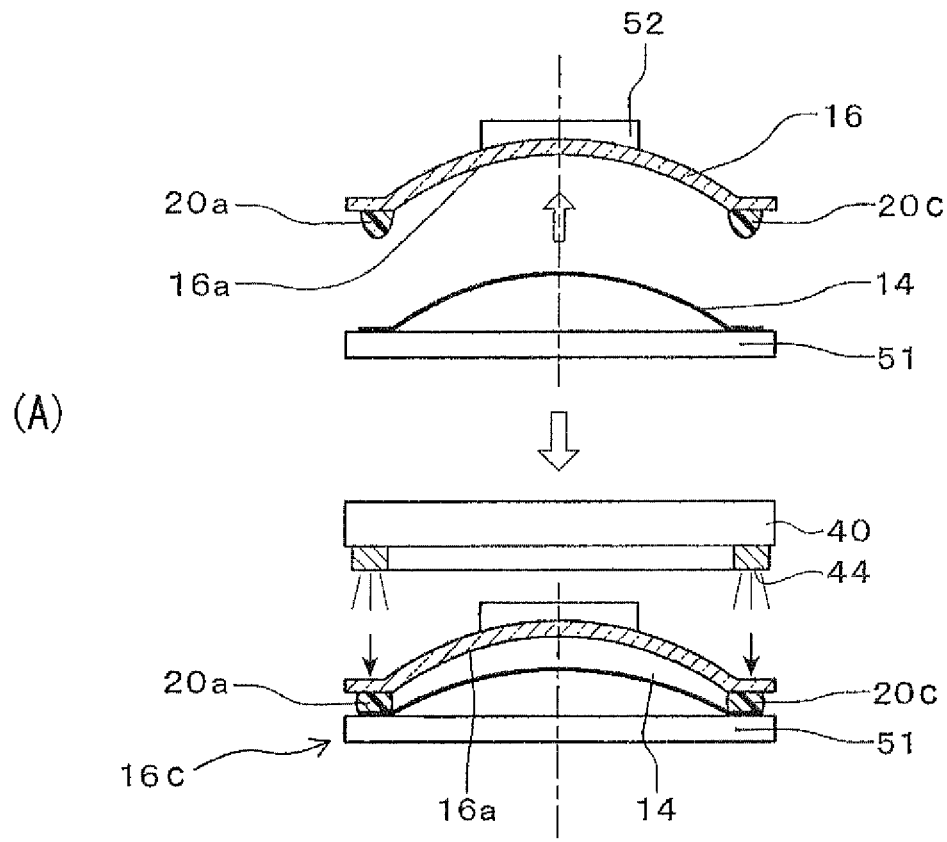
FIG. 9 A drawing descriptive of the assembly of a casting mold according to an embodiment of the present invention.
Figure 9:
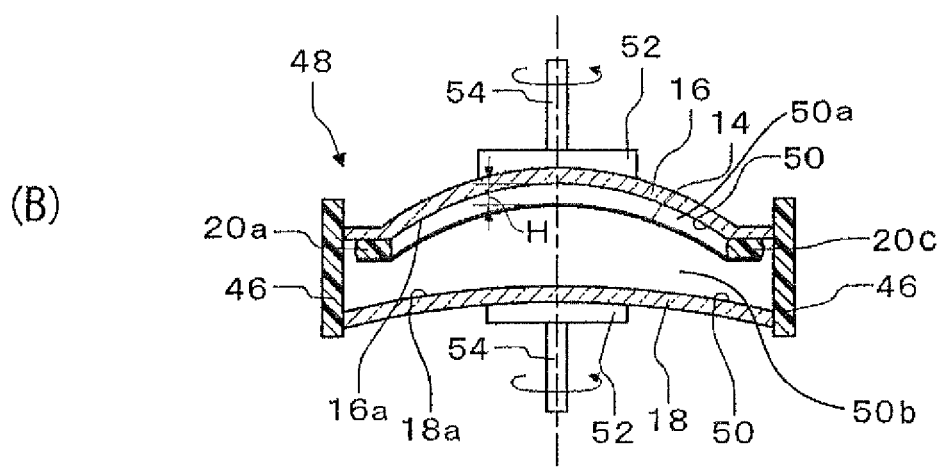
Figure 10:
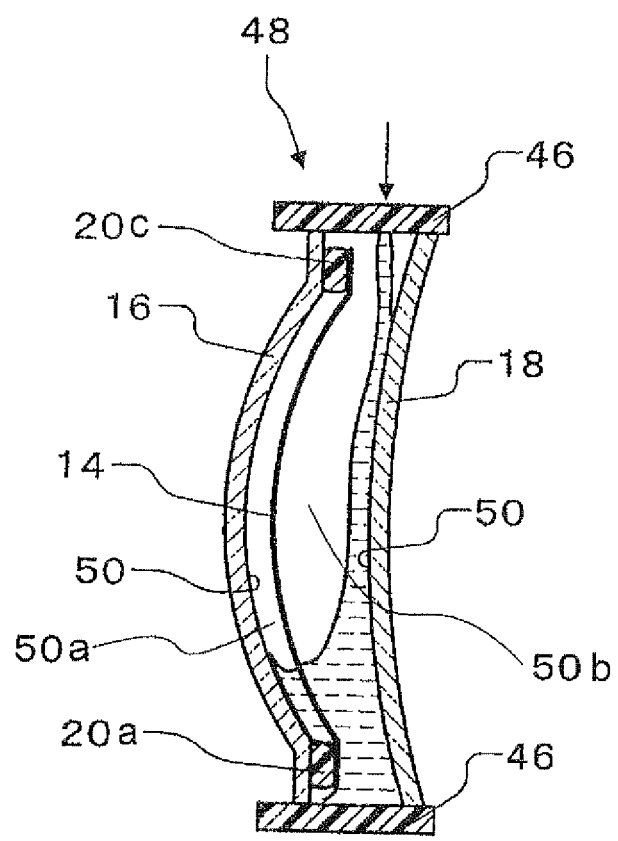
FIG. 10 A drawing descriptive of the casting of monomer into a casting mold according to an embodiment of the present invention.

FIGS. 9 and 10 are drawings descriptive of assembly of the casting mold.

As shown in FIG. 9(A), upper mold 16 is positioned close to the convex surface portion of polarizing film 14, brought closer until it reaches a preset, prescribed distance (a distance not exceeding the height of holding member 20), and holding member 20 is horizontally set on and brought into contact with polarizing film 14.

Subsequently, holding member 20 is irradiated with UV radiation by UV radiation irradiating device 40 to solidify holding member 20. Thus, polarizing film 14 and upper mold 16 are adhered together, forming an upper mold structure 16*c* in which polarizing film 14 is held by upper mold 16.

In the present embodiment, the following method is carried out to increase the precision of the clearance between upper mold 16 and the polarizing film.

First, the center height on the inner surface side (concave surface side) of the upper mold 16 being used and the height at the center of polarizing film 14 being used, which has been curved surface processed, are measured.

In measuring the height of polarizing film 14, since polarizing film 14 is soft, a non-contact sensor (such as a CCD transmission-type digital laser sensor of the IG series made by Keyence Corp.) is employed. The height is measured from a horizontal reference position on the lower surface side of polarizing film 14 to the top point of the spherical surface.

In measuring the height of upper mold 16, since the shape is not distorted by measurement pressure or the like, a contact-type measurement probe (such as a Digimatic Indicator 543 series made by Mitsutoyo Corporation) is used to measure the height from the same reference position as on the polarizing film to the top point of the spherical surface of upper mold 16.

Next, based on the center heights of upper mold 16 and polarizing film 14 that have been measured, upper mold 16 is displaced in parallel from above to achieve a predetermined spacing (clearance) between the concave surface side 16*a* of upper mold 16 and polarizing film 14. It is then brought into contact with the adhesive columns of support members 20 on polarizing film 14, and adhered and supported.

UV radiation irradiating device 40 is then driven, irradiating UV radiation from the tip of radiating lamp 44 onto adhesive 20 and solidifying adhesive 20.

The curing treatment of the UV-curable composition is normally completed by a short period of UV irradiation (several seconds to several tens of seconds), making it possible to inhibit the impact on the manufacturing cycle. As an example, UV radiation is irradiated for 15 seconds at 500 mW. When the level of UV radiation that is irradiated is determined to be inadequate, turntable 28 can be suitably rotated and the irradiation of UV radiation by UV radiation irradiating device 40 can be continuously directed onto the support member 20 that has been formed.

In addition, depending on the type of lens monomer, shrinkage or expansion of the monomer due to the heating, curing, and the like described further below will sometimes be of a negligible degree. In such cases, the shrinkage and expansion of the monomer need not be considered in setting the value of clearance H. Since some lens monomers will shrink or expand due to the heating, curing, and the like described further below, when employing such lens monomers, it suffices to take monomer shrinkage or expansion into account in establishing the value of clearance H.

An upper mold structure 16c in which the polarizing film is held by upper mold 16 is assembled as set forth above.

The polarizing film can be heated after being positioned in upper mold 16, and is also desirably heated prior to being positioned in upper mold 16. When heated after being positioned in upper mold 16, the shape of polarizing film 14 that has been secured by means of holding member 20 will sometimes change due to shrinkage. Thus, when polarizing film 14 is formed (curved surface processed or cut), it is better to take into account the change in shape of polarizing film 14.

The process of assembling casting mold 48 will be described next. Below, the state of upper mold 16 assembled with polarizing film 14 present within it, along with lower mold 18 and adhesive tape 46, will be referred to as casting mold 48.

The casting mold assembly employing the upper mold 16 structure and lower mold 18 with tape is as set forth above. For example, reference can be made to Japanese Unexamined Patent Publication (KOKAI) No. 2001-330806.

The method of assembling the casting mold using adhesive tape will be schematically described. As shown in FIG. 9(A), upper mold 16 is brought close to the convex surface (surface facing upper mold 16) of polarizing film 14. Alternatively, polarizing film 14 held on securing base 51 is brought close to upper mold 16 held by securing pad 52.

Next, the inner surface portion 16a of upper mold 16 and polarizing film 14 are brought together until a prescribed distance is reached (a distance of equal to or less than the height of adhesive 20) and support member 20 is brought into contact with polarizing film 14. Numeral 18a denotes the inner surface portion of lower mold 18.

Subsequently, UV radiation irradiating device 40 is driven to irradiate holding member 20 with UV radiation from the tip of irradiating lamp 44, solidifying adhesive 20. As a result, polarizing film 14 and upper mold 16 are adhered and the positioning of polarizing film 14 on upper mold 16 is completed.

Next, lower mold 18 is positioned facing the concave surface side of polarizing film 14 so that the distance between upper mold 16 and lower mold 18 forms a prescribed cavity. Material characteristics such as the polymerization shrinkage of the lens monomer are taken into account in determining the shape of the cavity. As a result, it is determined to satisfy a prescribed lens thickness based on the lens design.

Then, as shown in FIG. 9(B), with a prescribed distance being maintained between upper mold 16 and lower mold 18, an adhesive tape 46 having an adhesive layer on one side thereof is run completely around the lateral surfaces of upper mold 16 and lower mold 18, being wound slightly more than one time around. In this process, upper mold 16 and lower mold 18 are set on fixed pad 52. Fixed pad 52 is driven to rotate by a rotating shaft 54 protruding from a motor device, not shown in the drawing.

The material of adhesive tape 46 is desirably not one that reacts with the lens monomer to produce fogging of the lens or impede polymerization. From perspectives such as ease of use and economy, a plastic adhesive tape is desirably employed. By way of example, adhesive tapes with various combinations of a base material in the form of polypropylene or polyethylene terephthalate and adhesive in the form of acrylic, natural rubber, or silicone can be prepared. It is also possible to provide casting holes (not shown in the drawing) in adhesive tape 46 for casting monomer.

As shown in FIG. 10, a blended lens monomer is then cast into the casting mold 48 that has been assembled. The lens monomer will be described further below. A casting device is used to cast monomer through an casting hole into the cavity 50 formed by upper mold 16, lower mold 18, and adhesive tape 46 so that cavity 50 is filled and no air bubbles remain. Monomer is cast between upper mold 16 and polarizing film 14, and between lower mold 18 and polarizing film 14. Monomer can be separately cast between upper mold 16 and polarizing film 14 (cavity 50a) and between lower mold 18 and polarizing film 14 (cavity Sob). As set forth above, by employing a polarizing film 14 with an inner diameter that is slightly smaller than that of upper and lower molds 16 and 18, it is possible to cause monomer to circulate from the side of one of the molds to the side of the other mold.

The lens monomer is not specifically limited. The various monomers that are normally used to manufacture plastic lenses can be employed. For example, a monomer comprising a benzene ring, naphthalene ring, ester bond, carbonate bond, or urethane bond in the molecule can be employed. Compounds containing sulfur, halogen elements can be employed. In particular, a compound having a nuclear halogen-substituted aromatic ring can be employed. In particular, a compound having a nuclear halogen-substituted aromatic ring is suitable. One, two, or more monomers having the above functional groups can be employed to manufacture the lens monomer. Examples are styrene, divinyl benzene, phenyl (meth)acrylate, benzyl (meth)acrylate, naphthyl (meth)acrylate, methyl (meth)acrylate, diethylene glycol bisallyl carbonate, diallyl (iso)phthalate, dibenzyl itaconate, dibenzyl fumarate, chlorostyrene, nuclear halogen-substituted styrene, nuclear halogen-substituted phenyl (meth)acrylate, nuclear halogen-substituted benzyl (meth)acrylate, (di)(meth)acrylate of tetrabromobisphenol A derivative, diallyl carbonate of tetrabromobisphenol A derivative, diorthochlorobenzyl itaconate, diorthochlorobenzyl fumarate, diethylene glycol bis(orthochlorobenzyl) fumarate, (di)ethylene glycol di(meth)acrylate, glycidyl methacrylate, xylylene diisocyanate, hexamethylene diisocyanate, other polyfunctional isocyanate reaction products, reaction products of monohydroxyacrylates of nuclear halogen-substituted phenol derivatives and polyfunctional isocyanates, reaction products of monohydroxyacrylates of nuclear halogen-substituted biphenol derivatives and polyfunctional isocyanates, reaction products of xylylene diisocyanates and polyfunctional mercaptans, reaction products of glycidyl methacrylates and polyfunctional methacrylates, and mixtures thereof.

The polarizing lens according to an aspect of the present invention has, for example a refractive index of equal to or higher than 1.50, desirably a refractive index of equal to or higher than 1.60. By way of example, the refractive index is equal to or lower than 1.74. Unless specifically stated otherwise, the refractive index in the present invention refers to the refractive index nD. To obtain a polarizing eyeglass lens having a lens thickness equivalent to that of common eyeglass lenses not containing an internal polarizing film, 1.60 thiourethane resin and thioepoxy resin are desirable. To obtain a thin lens affording good esthetics, a transparent plastic lens with a refractive index of equal to or higher than 1.60 that is made of a high-refractive-index material is desirable. In such cases, monomers are desirably blended in the manner set forth below.

(1) 1.60 Thiourethane (Monomer of Thiourethane with a Refractive Index of 1.60)

A plastic lens starting material in the form of 50 g of norbornene diisocyanate, 24 g of a polythiol compound comprised chiefly of pentaerythritol tetrakis(3-mercaptopropionate), and 26 g of a polythiol compound comprised chiefly of 4-mercaptomethyl-3,6-dithia-1,8-octanedithiol are admixed and thoroughly stirred.

To this are added 2.5 g of a UV absorbant sold under the trademark name SEESORB709 (made by Shipro Kasei) and 0.1 g of an internal mold release agent sold under the trademark name "MR-use internal mold release agent" (made by Mitsui Chemicals). The components are mixed and thoroughly stirred to obtain a fully dispersed or dissolved plastic lens starting material. To this is added 250 ppm of a catalyst in the form of dibutyltin dichloride. The mixture is thoroughly stirred at room temperature to obtain a uniform liquid composition. The pressure is then reduced to 5 mmHg and degassing is conducted for 30 minutes with stirring.

(2) 1.67 Thiourethane (Monomer of Thiourethane Base Material with a Refractive Index of 1.67)

A plastic lens starting material in the form of 50.6 g of m-xylene diisocyanate and 49.4 g of 4,8-dimercaptomethyl-1,11-dimercapto-3,6,9-trithiaundecane is mixed and thoroughly stirred. Instead of 4,8-dimercaptomethyl-1,11-dimercapto-3,6,9-trithiaundecane, it is also possible to use 4,7-dimercaptomethyl-1,11-dimercapto-3,6,9-trithiaundecane or 5,7-dimercaptomethyl-1,11-dimercapto-3,6,9-trithiaundecane.

To this are added 1.2 g of a UV absorbant sold under the trademark name SEESORB701 (made by Shipro Kasei) and 0.1 g of an internal mold release agent sold under the trademark name "MR-use internal mold release agent" (made by Mitsui Chemicals). The components are mixed and thoroughly stirred to obtain a fully dispersed or dissolved plastic lens starting material. To this is added 100 ppm of a catalyst in the form of dibutyltin dichloride. The mixture is thoroughly stirred at room temperature to obtain a uniform liquid. The pressure of the composition is then reduced to 5 mmHg and degassing is conducted for 30 minutes with stirring.

(3) 1.74 Thioepoxy (Monomer of Thioepoxy Base Material with a Refractive Index of 1.74)

A plastic lens starting material in the faint of 90.0 g of bis(2,3-epithiopropyl)disulfide and 10.0 g of 4,8-dimercaptomethyl-1,11-dimercapto-3,6,9-trithiaundecane is mixed and thoroughly stirred it is also possible to employ 90.0 g of bis(2,3-epithiopropyl)disulfide and replace the 4,8-dimercaptomethyl-1,11-dimercapto-3,6,9-trithiaundecane with 4,7-dimercaptomethyl-1,11-dimercapto-3,6,9-trithiaundecane or 5,7-dimercaptomethyl-1,11-dimercapto-3,6,9-trithiaundecane.

To this is added 1.2 g of a UV absorbant sold under the trademark name SEESORB701 (made by Shipro Kasei) and the mixture is thoroughly stirred and completely dissolved. Subsequently, 0.10 g of a catalyst in the form of N,N-dimethylcyclohexylamine is admixed. The mixture is thoroughly stirred at room temperature to obtain a uniform liquid. The pressure of the composition is then reduced to 5 mmHg and degassing is conducted for 30 minutes with stirring.

Subsequently, a casting mold 48 filled with lens monomer is placed in a heating furnace and heated to cure the heat-curable lens monomer. In this process, the heating conditions, determined based on the type of lens monomer, are desirably 0 to 150° C., preferably 10 to 130° C. The temperature is desirably raised over 5 to 50 hours, preferably over 10 to 25 hours, to conduct polymerization and curing. For example, the temperature can be maintained at 30° C. for 7 hours and then raised from 30 to 120° C. over 10 hours.

Once the heat treatment has ended, the monomer is solidified to mold a lens including a polarizing film 14 embedded in a casting mold 48. The casting mold 48 is removed from the heating furnace, the adhesive tape 46 is peeled off, and the lens is removed from upper mold 16 and lower mold 18 to obtain the lens 100 shown in FIG. 1.

When the lens obtained is a semifinished lens, the concave surface 121 of lens 100 can then be ground and/or polished in a curve generator and polishing device to obtain an eyeglass lens for correcting vision that corresponds to the power of a prescription.

Based on orders that have been received, the eyeglass lens following processing can be subjected to various surface processings such as primers, hardcoats, antireflective films, and water repellency to impart impact resistance, impart abrasion resistance, prevent glare, and impart water repellence.

A hardcoat layer can impart resistance to scratching to the plastic lens. Since the adhesion of antireflection layers to plastic lenses is generally not good, a hardcoat layer can be inserted between the plastic lens and the antireflective layer to enhance the adhesion of the antireflective layer and prevent separation.

A hardcoat layer is generally formed by applying a curable composition to the surface of the plastic lens and curing the coating. Depending on the type of curable composition, the curing treatment can be conducted by heating, irradiation with light, or the like. In one embodiment, a heat-curable composition is coated on the polarizing lens following mold separation and then heated to form a cured coating (hardcoat layer). When the plastic lens is a thermoplastic resin, rather than heat curing, electromagnetic waves such as UV radiation or ionizing radiation such as an electron beam is desirably employed for curing. Examples of such curable compositions are photocuring silicon compositions comprised chiefly of silicone compounds forming silanol groups when irradiated with UV radiation and organopolysiloxanes having reactive groups such as halogen atoms and amino groups that undergo condensation reactions with silanols; acrylic UV-curable monomer compositions such as UK-6074 made by Mitsubishi Rayon (Ltd.); and inorganic microparticle-containing heat-curable compositions in which inorganic microparticles with particle diameters of equal to or more than 1 nm and equal to or less than 100 nm, such as $SiO_2$ and $TiO_2$, are dispersed in silane coupling agents or silane compounds having hydrolyzable groups such as methoxy groups and polymerizable groups such as vinyl groups, allyl groups, acrylic groups, or methacrylic groups.

The coating can be formed by a method such as dipping, spin coating, spraying, flowing, or doctor blade. For example, heating and drying can be conducted at a temperature of 40 to 200° C. for from several minutes to several hours to form a coating. Prior to forming the coating, the surface of the lens is desirably treated by, for example, a high-voltage discharge such as microwaves or corona discharge to enhance adhesion. Subsequently, the coating that has been formed can be cured with heat, UV radiation, an electron beam, or the like to form a hardcoat layer.

An antireflective layer can be in the form of a single layer of an inorganic film or an organic film, or be comprised of multiple layers. Examples of inorganic materials that can constitute the inorganic film are: $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$. These can be employed singly, or in combinations of two or more. In the case of a plastic lens, $SiO_2$, $ZrO_2$, $TiO_2$, and $Ta_2O_5$, which can be vacuum-deposited at low temperature, are desirable. When constituting a multilayer film, the outermost layer is desirably $SiO_2$. When an antifouling film relating to the present invention is formed on the surface of an antireflective layer the outermost layer of which is $SiO_2$ in this manner, it is possible to further enhance the durability of the antifouling film in the optical article obtained. An example of such a multilayer film of inorganic coatings is a sequentially laminated four-layer structure comprised of a $ZrO_2$ layer and an $SiO_2$ layer with a combined optical film thickness of $\lambda/4$; a $ZrO_2$ layer with an optical film thickness of $\lambda/2$; and an $SiO_2$ layer with an optical film thickness of $\lambda/4$ on the lens side. In this context, $\lambda$ is the design wavelength, with 520 nm usually being employed.

The inorganic coatings can be formed by, for example, vacuum vapor deposition, ion plating, sputtering, CVD, and precipitation by chemical reaction in a saturated solution.

By means of the method set forth above, it is possible to obtain a polarizing lens with little surface deformation on the lens surface, desirably on the object-side surface, in the form of a polarizing lens in which a polarizing film is embedded within the lens. As set forth above, inhibiting deformation so that the difference (Rmax−Rmin) between the maximum radius of curvature Rmax and the minimum radius of curvature Rmin at the geometric center position of the object-side surface is less than 4 mm is possible in an aspect of the present invention. In this process, keeping the minimum value of the distance between the object-side surface and the polarizing lens to equal to or less than 0.7 mm makes it possible to achieve an (Rmax−Rmin) of less than 4 mm in a lens in which the polarizing film is relatively close to the object-side surface and in which the object-side surface tends to deform due to the deforming of the polarizing film. For example, in the case of the lenses with refractive indexes of 1.60 to 1.74 that are commonly employed (an example being a thiourethane lens with a refractive index of 1.67), when the base curve on the object-side surface is about equal to or less than 5.25 D and (Rmax−Rmin) is less than 4 mm, it is possible to achieve an astigmatism AS<0.17. As is widely known, the base curve denotes the surface refractive power in diopters (D). The relation between the radius of curvature (R: unit mm), diopters (D), and refractive index (n) is denoted as $D=1,000(n-1)/R$. The manufacturing method according to an aspect of the present invention makes it possible to prevent deformation, not just in lenses having the above base curves, but in lenses of various shapes, when the minimum value of the distance between the object-side surface and the polarizing film is equal to or less than 0.7 mm, even when the polarizing film is relatively close to the object-side surface and the object-side surface is affected by deformation of the polarizing film and tends to deform.

EXAMPLES

The present invention will be further described below through Examples. However, the present invention is not limited to the embodiments given in Examples.

Example 1

1. Moistening Treatment and Curved Surface Processing of Polarizing Film Followed by Heat Treatment A commercial dichroic dye polarizing film 14 made of PVA was placed in a constant humidity, high-temperature device and subjected to moistening treatment so that the moisture content at the start of curved surface processing would be about 4%. The moistened polarizing film was placed for about 2 minutes at room temperature (20 to 25° C.) and then curved surface processed by the method described above based on FIG. 4. The curved surface processing was also conducted at room temperature.

Next, the polarizing film that had been curved surface processed was heated for 30 minutes at 120° C. in a commercial hot air circulating oven. The heating was conducted without using glass mold 60. Following the heating, by means of the method described above based on FIGS. 6 to 8, adhesive columns were provided at four spots along the perimeter of the inner surface of the upper mold and an upper mold structure was prepared. Subsequently, by the method described above based on FIG. 9, polarizing film 14 was inserted, and upper mold 16 and lower mold 18 were assembled into casting mold 48 with adhesive tape 46. The surface shape of upper mold 16 and lower mold 18 was spherical, had an inner diameter of 80 mm, and had a radius of curvature of 130.4 mm.

2. Molding the Lens by Cast Polymerization and Separation from the Mold

A 50.6 quantity of m-xylene diisocyanate and 49.4 g of 4,8-dimercaptomethyl-1,11-dimercapto-3,6,9-trithiaundecane were mixed and thoroughly stirred to obtain a plastic lens starting material.

To this were added 1.2 g of a UV absorbant sold under the trademark name SEESORB701 (made by Shipro Kasei) and 0.1 g of an internal mold release agent sold under the trademark name "MR-use internal mold release agent" (made by Mitsui Chemicals). The components were mixed and thoroughly stirred to obtain a fully dispersed or dissolved plastic lens starting material. To this was added 100 ppm of a catalyst in the form of dibutyltin dichloride. The mixture was thoroughly stirred at room temperature to obtain a uniform liquid. The pressure of the composition was then reduced to 5 mmHg and degassing was conducted for 30 minutes with stirring to prepare a lens monomer.

The lens monomer thus prepared was cast into casting mold 48. Because a polarizing film with a diameter that was smaller than the inner diameter of the upper mold and lower mold was employed, it was possible to smoothly cast the lens monomer.

Subsequently, the casting mold was placed in a heating furnace and maintained for 7 hours at 30° C. Subsequently, the temperature was raised over 10 hours to 30 to 120° C. to conduct heat curing.

Following the heat curing, casting mold 48 was removed from the heating furnace, adhesive tape 46 was peeled off, and the lens was removed from upper mold 16 and lower mold 18 to obtain the lens 100 (a semifinished lens) shown in FIG. 1. The refractive index nD of the lens obtained was 1.67.

3. Grinding/Polishing the Eyeball-Side Surface

The concave surface 121 of the lens 100 obtained was ground/polished with a curve generator and a polishing device to obtain an eyeglass lens for vision correction that was in line with the prescription power.

4. Surface Processing (Forming a Hardcoat Film)
A coating liquid for forming a hardcoat layer was prepared as follows.
(1) Preparation of Coating Liquid
A 500 g quantity of perfluorohexane and 350 g of IPA dispersed silicon oxide sol (Oscar 1432, made by Catalysts & Chemicals Ind. Co., Ltd., 30 weight percent solid component concentration) were admixed. A 25 g quantity of fluoroalkylsilane (TSL8233, made by GE-Toshiba Silicones (Ltd)), 220 g of γ-glycidoxypropyltrimethoxysilane, and 25 g of tetraethoxysilane were admixed. To the mixture was added dropwise 90 g of 0.05 N hydrochloric acid aqueous solution with stirring and the mixture was aged a day and a night. To this liquid were added 2.6 g of magnesium perchlorate, 0.2 g of silicone surfactant (product name "FZ-2110," made by NUC Corporation), and 0.5 g of phenol oxidation inhibitor (product name "Antage Crystal" made by Kawaguchi Chemical Industry Co., Ltd.). The mixture was stirred for 4 hours and aged for a day and a night to prepare the coating liquid.
(2) Coating and Curing
Coating of the coating liquid thus obtained was carried out by immersing a lens that has been subjected to an alkali treatment in the coating liquid. A withdrawal rate of 26 cm/min was adopted. Following coating, air drying was conducted for 20 minutes at 80° C., followed by calcination for 120 minutes at 130° C. The cured coating thus obtained was about 2 μm in thickness.
(Antireflective Film)
A multilayer antireflective film comprised of the five layers of $SiO_2$, $ZrO_2$, $SiO_2$, $ZrO_2$, and $SiO_2$ was sequentially formed by vacuum vapor deposition on the lens from the lens substrate toward the atmosphere.

The vapor deposition apparatus was an electron beam vapor deposition device equipped with a vacuum vessel, an exhaust device, and a gas supplying device. The vacuum vessel was equipped with a lens supporting base on which was positioned the lens having the hardcoat layer formed (film formation), a substrate heater for heating the lens that was set on the lens supporting base, and a filament generating thermal electrons.

In the vapor deposition device, a vapor deposition material that was set on a vaporization source (crucible) was irradiated with thermal electrons by an electron gun and vaporized, depositing the material on the lens.

The various layers of optical film were formed so that the initial $SiO_2$ layer, the equivalent film layer of $ZrO_2$ and $SiO_2$, the following $ZrO_2$ layer, and the uppermost layer of $SiO_2$ each had a thickness of λ/4. The design wavelength λ was 520 nm.

<Evaluation of the Optical Performance of the Lens>
To evaluate lens deformation of lens 100 (in a round, uncut state) prior to surface processing but after removal from the mold, the optical performance was evaluated based on the following items. Visual inspection was conducted by an inspector who had been in the lens inspection industry for three or more years. The evaluation results are given in Table 1.
(1) Shape Deformation
The maximum radius of curvature (mm) (Rmax) and the minimum radius of curvature (mm) (Rmin) at the position at the geometric center of the convex surface of lens 100 (=optical center) were measured with a radius of curvature measuring device "FOCOVISON" (made by Automation & Robotics).

The difference in curvature (Rmax−Rmin) of the maximum radius of curvature (mm) and minimum radius of curvature (mm) was adopted as an index of deformation (astigmatism) of the lens and evaluated as follows. The convex surface of lens 100 was of spherical surface design. The geometric center of the convex surface was the intersection of the perpendicular line passing through the center of the circle when lens 100 was viewed from above and the lens convex surface side 111.

A curvature difference of equal to or more than 0 but less than 3 mm: ○ (passing), equal to or more than 3 mm but less than 4 mm: Δ (some deformation seen but no obstruction when worn in glasses), equal to or more than 4 mm: X (practical obstruction).
(2) Discoloration of Polarizing Film 14
A visual observation was made for the presence or absence of discoloration of polarizing film 14 within lens 100.
No discoloration: ○
Discoloration of a degree that did not produce a change in hue was seen: Δ
Discoloration in which the hue was clearly different was seen: X
(3) Distortion of Polarizing Film 14
Distortion (deformation of the surface shape) of polarizing film 14 within lens 100 was visually observed (by an inspector who had been in the lens inspection industry for three or more years).
No distortion whatsoever: ○
Distortion seen in some of the peripheral portion of the lens, but no problem presented for eyeglass wear: Δ
Immediately visible distortion: X
Overall Evaluation
When no evaluation of X was received for any from among the deformation of lens 100, discoloration of polarizing film 14, and distortion of polarizing film 14, an evaluation of ○ was awarded. When one X was received, an X was awarded. Those receiving a ○ for all items were evaluated as ⊚.

Examples 2 to 5 and Comparative Examples 1 to 4

Under the conditions indicated in Table 1, with the exception that polarizing film 14, which had been curved surface processed, was heated, lenses 100 were prepared in the same manner as in Example 1. In Comparative Example 1, the polarizing film was used without being heated.

Examples 6 and 7 and Comparative Examples 5 and 6

In Example 1, with the exceptions that a commercial polarizing film (TPT) having a protective film made of TAC on both sides of a PVA dichroic dye polarizing film was employed instead of the commercial PVA dichroic dye polarizing film 14 and heating of the polarizing film was conducted under the conditions of Table 1, lenses 100 were prepared in the same manner as in Example 1.

Example 8

With the exception that polarizing film 14 was held and heated with the curved surface processing mount 60 that was used in curved surface processing, a lens 100 was prepared in the same manner as in Example 2.

In Examples 1 to 7, in which curved surface processing mount 60 was not employed, slight distortion of the shape of polarizing film 14 occurred. By contrast, in Example 8, in which curved surface processing mount 60 was employed, distortion was inhibited and a lens 100 with better optical performance was obtained.

Accordingly, it was found that shape deformation and distortion of polarizing film 14 could be suitably inhibited and a lens 100 with a more attractive external appearance could be obtained by holding polarizing film 14 in curved surface processing mount 60 and conducting heating.

TABLE 1

| | | | Heating conditions of polarizing film | | | | | | | | |
|---|---|---|---|---|---|---|---|---|---|---|---|
| | Polarizing film | Glass mold | Heating temp. (° C.) | Heating period (hour) | Rmax (nm) | Rmin (mm) | Rmax − Rmin (nm) | Lens deformation | Discoloration of polarizing film | Distortion of polarizing film | Overall evaluation |
| Ex. 1 | PVA | None | 120 | 0.5 | 129 | 127.9 | 1.1 | ○ | ○ | Δ | ○ |
| Ex. 2 | PVA | None | 120 | 2 | 129 | 126.3 | 2.7 | ○ | ○ | Δ | ○ |
| Ex. 3 | PVA | None | 130 | 2 | 129.7 | 126.9 | 2.8 | ○ | ○ | Δ | ○ |
| Ex. 4 | PVA | None | 105 | 2 | 130.1 | 126.6 | 3.5 | Δ | ○ | Δ | ○ |
| Ex. 5 | TAC/PVA | None | 140 | 2 | 128.9 | 128.1 | 0.8 | ○ | Δ | Δ | ○ |
| Ex. 6 | TAC/PVA | None | 120 | 2 | 129 | 127.8 | 1.2 | ○ | ○ | Δ | ○ |
| Ex. 7 | PVA | None | 140 | 2 | 129.2 | 128 | 1.2 | ○ | Δ | Δ | ○ |
| Ex. 8 | PVA | Employed | 120 | 2 | 129 | 127.7 | 1.3 | ○ | ○ | ○ | ◎ |
| Comp. Ex. 1 | PVA | None | — | — | 135.7 | 127.9 | 7.8 | X | ○ | Δ | X |
| Comp. Ex. 2 | PVA | None | 60 | 5 | 136.1 | 128.1 | 8 | X | ○ | Δ | X |
| Comp. Ex. 3 | PVA | None | 100 | 5 | 132.4 | 127.8 | 4.6 | X | ○ | Δ | X |
| Comp. Ex. 4 | PVA | None | 150 | 2 | 129.5 | 128 | 1.5 | ○ | X | Δ | X |
| Comp. Ex. 5 | TAC/PVA | None | 100 | 2 | 136.5 | 126.5 | 10 | X | ○ | Δ | X |
| Comp. Ex. 6 | TAC/PVA | None | 150 | 2 | 129.5 | 128 | 1.5 | ○ | X | Δ | X |

As shown in Table 1, in Example 4, in which curved surface processed polarizing film 14 was heated at 105° C., the difference in the radius of curvature (Rmax−Rmin) was 3.5 mm. In Examples 5 and 7, in which polarizing film 14 was heated at 140° C., a change in color of a degree that did not present a change in hue was observed. However, none of the lenses obtained in any of these Examples presented any practical obstruction to use as a polarizing lens.

It was found that by heating at 120° C. to 130° C., it was possible to obtain a lens 100 with little lens deformation, little discoloration of polarizing film 14, good optical performance, and an appealing external appearance. In Examples 6 and 7, in which TPT was employed as polarizing film 14, the same results were achieved. Thus, by employing a polarizing film that had been heated under the same conditions, even for films other than PVA films, it was possible to inhibit shape deformation of the lens. Since PVA films are inexpensive, the use of a PVA film can provide a lens 100 that is less expensive.

By contrast, in Comparative Examples 1 to 3 and 5, the difference in the radius of curvature (Rmax−Rmin) was equal to or greater than 4 mm, producing significant shape deformation of the lens. In each of Comparative Examples 1 to 3 and 5, the heating temperature was less than 105° C. and adequate shrinkage of the polarizing film was not thought to have occurred prior to casting a polymerizable composition for the lens substrate. Thus, the polarizing film was thought to shrink during heat curing, deforming the lens.

In Comparative Examples 4 and 6, the polarizing film was heated at 150° C. Although deformation of the lens was inhibited, the polarizing film became denatured, producing discoloration.

Based on the above results, according to an aspect of the present invention, it was determined that a polarizing lens with little deformation of the lens surface shape that may cause astigmatism could be provided. The minimum distance between the polarizing film and the object-side surface of the polarizing lens obtained in the above Examples was equal to or more than 0.3 mm and equal to or less than 0.7 mm. The polarizing film was positioned relatively closely to the object-side surface. According to an aspect of the present invention, deformation of the object-side surface can be inhibited in such a polarizing lens.

Film member 10, which had been curved surface processed, was held by the curved surface processing mount 60 employed in curved surface processing and heated. Thus, change from the shape set for the shape of curved surface portion 61a of film member 10 was inhibited. Accordingly, it was possible to manufacture a lens 100 with a more appealing external appearance.

A polarizing film in the form of common PVA was employed as polarizing film 14. Since PVA films are inexpensive, a lens 100 with little astigmatism was provided more inexpensively.

(Evaluation with Regard to Clearance)

Samples 1-1 to 1-12 and Samples 2-1 to 2-5 in Table 2 are polarizing lenses in which polarizing films are embedded within the lens that were obtained in steps 1. to 3. of Example 1, with the exception that the manufacturing conditions shown in Table 2 were adopted. These lenses will be referred to as finished product lenses, hereinafter.

TABLE 2

| | Polarizing film | Lens substrate | Tape/Gasket | Mode of positioning | Base curve of lens (D) | Curvature of polarizing film (D) | H (mm) | W1 (SF, center portion) (mm) | W1 (SF, outer perimeter portion) (mm) | W (finished product) (mm) |
|---|---|---|---|---|---|---|---|---|---|---|
| Sample 1-1 | PVA | 1.60 thiourethane | Tape | Adhesive | 4 | 3 | 0.7 | 0.7 | — | 1.1 |
| Sample 1-2 | PVA | 1.60 thiourethane | Tape | Adhesive | 4 | 3 | 0.3 | 0.3 | — | 1.1 |
| Sample 1-3 | PVA | 1.67 thiourethane | Tape | Adhesive | 4 | 3 | 0.7 | 0.7 | — | 1.1 |
| Sample 1-4 | PVA | 1.74 thioepoxy | Tape | Adhesive | 4 | 3 | 0.7 | 0.7 | — | 1.1 |
| Sample 1-5 | TPT | 1.60 thiourethane | Tape | Adhesive | 4 | 3 | 0.7 | 0.7 | — | 1.1 |
| Sample 1-6 | PET | 1.60 thiourethane | Tape | Adhesive | 4 | 3 | 0.7 | 0.7 | — | 1.1 |
| Sample 1-7 | PVA | 1.60 thiourethane | Tape | Adhesive | 2 | 3 | 0.7 | 0.7 | — | 1.1 |
| Sample 1-8 | PVA | 1.60 thiourethane | Tape | Adhesive | 2 | 3 | 0.3 | 0.3 | — | 1.1 |
| Sample 1-9 | PVA | 1.60 thiourethane | Tape | Adhesive | 6 | 4 | 0.7 | — | 0.7 | 1.1 |
| Sample 1-10 | PVA | 1.60 thiourethane | Tape | Adhesive | 8 | 6 | 0.7 | — | 0.7 | 1.1 |
| Sample 1-11 | PVA | 1.60 thiourethane | Tape | Adhesive | 8 | 6 | 0.3 | — | 0.3 | 1.1 |
| Sample 1-12 | PVA | 1.60 thiourethane | Tape | Adhesive | 10 | 8 | 0.7 | — | 0.7 | 1.1 |
| Sample 2-1 | PVA | 1.60 thiourethane | Tape | Adhesive | 2 | 3 | 0.2 | — | — | — |
| Sample 2-2 | PVA | 1.60 thiourethane | Tape | Adhesive | 2 | 3 | 0.8 | 0.8 | — | 1.2 |
| Sample 2-3 | PVA | 1.60 thiourethane | Tape | Adhesive | 8 | 6 | 0.2 | — | — | — |
| Sample 2-4 | PVA | 1.60 thiourethane | Tape | Adhesive | 8 | 6 | 0.8 | — | 0.8 | 1.2 |
| Sample 2-5 | PVA | 1.60 thiourethane | Gasket | Gasket | 2 | 3 | 0.7 | 0.5-1.2 | — | 1.6 |

In Table 2, H denotes the minimum distance (referred to simply as "clearance H" hereinafter) between the upper mold inner surface and the polymerizing film in the casting mold. W1 denotes the minimum distance (referred to simply as distance W1) between the object-side surface in the plastic lens (a semifinished lens) and the polarizing film. W (referred to simply as "thickness W" hereinafter) denotes the minimum value of the thickness of the lens obtained following step 3. SF is an abbreviation of "semifinished lens". The base curve of the lens is the base curve of the object-side surface. The position where the clearance is minimal is the center portion (the position of the top T) in a semifinished lens when the base curve is less than 6 D. When the base curve is equal to or greater than 6 D, it is on the outer perimeter in a semifinished lens. Thus, for the various samples, the clearance H was set at that position. In the polarizing lenses that were prepared, the position where the distance between the eyeball-side surface and the polarizing film became the minimum was identical to the positions where clearance H was set. For each sample, ten lenses were prepared. In some samples, the curvature of the polarizing film changed based on the base curve of the lens. However, in all of the samples, it was possible to employ polarizing films of identical curvature.

Sample 1-5 in Table 2 is an example in which a TPT film was employed as a polarizing film. Sample 1-6 is an example in which a PET film was employed as a polarizing film.

In Table 2, the term "1.60 thiourethane" indicates a lens in which the lens substrate was thiourethane with a refractive index of 1.60; "1.67 thiourethane" indicates a lens in which the lens substrate was thiourethane with a refractive index of 1.67; and "1.74 thioepoxy" indicates a lens in which the lens substrate was thioepoxy with a refractive index of 1.74.

In Table 2, Sample 2-5 is a lens obtained in the same manner as Sample 1-1 with the exception that instead of adhering the polarizing film to the inner surface of the upper mold with adhesive, the polarizing film was inserted and held in an insertion slot provided in a gasket.

In Samples 1-1 and 1-2, when clearance H was set to equal to or more than 0.3 mm and equal to or less than 0.7 mm, polarizing lenses in which distance W1 was equal to or more than 0.3 mm and equal to or less than 0.7 mm were obtained. By processing the surface of the lens on the eyeball side, it was possible to obtain finished product lenses in which the thickness W was 1.1 mm without scratching the polarizing films.

In Samples 1-3 and 1-4, in which the lens substrate was changed, in Samples 1-5 and 1-6, in which the material of the polarizing film was changed, and in Samples 1-7 to 1-12, in which the base curve of the lens was changed, it was also possible to obtain finished product lenses in which thickness W was 1.1 mm. In plastic lenses (Samples 1-2 and 1-8) in which the distance W1 was 0.3 mm, surface processing was conducted for removal such that thickness W became from about 0.6 mm to about 0.7 mm. When thickness W was made less than 1.1 mm, the strength of the finished product lens sometimes became inadequate. Thus, surface processing was stopped at about 1.1 mm.

By contrast, in Samples 2-1 and 2-3, clearance H was set to 0.2 mm. Thus, in the step of casting the monomer, it was not possible to get the monomer to flow uniformly between the first mold and the polarizing film.

In Samples 2-2 and 2-4, clearance H was set to 0.8 mm. Thus, thickness W1 of the finished product lens became 1.2 mm due to the processing limits of the prescription surface. This was thicker than a normal eyeglass lens not containing a polarizing film.

In Sample 2-5, a plastic lens was manufactured using a gasket. As a result, the curved surface precision of the polarizing film fluctuated. Of the ten plastic lenses manufactured, there was variation in the distance W1 over a range of 0.5 mm to 1.2 mm. As a result, there was a possibility of the polarizing films getting scratched, and the thickness W could not be surface processed from 0.3 mm to 0.4 mm. The thickness W of the finished product lens was 1.6 mm, which was thicker than in an ordinary eyeglass lens not containing a polarizing film.

Based on the above results, it was possible to obtain a polarizing lens capable of providing a thin eyeglass lens by surface processing of the eyeball-side surface in the form of a semifinished lens within which was embedded a polarizing film, desirably by using tape and adhesive to assemble a casting mold so that the minimum value of the distance between the object-side surface and the polarizing film became equal to or more than 0.3 mm and equal to or less than 0.7 mm.

In Sample 1-1, the base curve of the lens (base curve of the refractive surface on the convex side) was 4 (D) and the curvature of the polarizing film was 3 (D). The curvature of the polarizing film was thus shallower by 1 (D). The spacing at the position of the polarizing film corresponding to the top of the lens was set to 0.7 mm. After lens molding, the concave surface of the lens was curve-generated and polished. The lens thickness at the center of the lens became 1 mm.

In Sample 1-7, the base curve of the lens was 2 (D), the curvature of the polarizing film was 3 (D), and the curvature of the polarizing film was deeper by 1 (D). The spacing at the position of the polarizing film corresponding to the top of the lens was set to 0.7 mm. After lens molding, the concave surface of the lens was curve-generated and polished to achieve a thickness in the center portion of the lens of 1.1 mm.

In Sample 1-9, the base curve of the lens was 6 (D), the curvature of the polarizing film was 4 (D), and the curvature of the polarizing film, was shallower by 2 (D). The spacing at the position of the polarizing film corresponding to the top of the lens was set to 0.7 mm. After lens molding, the concave surface of the lens was curve-generated and polished so that the thickness of the lens in the perimeter portion of the lens became 1.1 mm.

In Sample 1-10, the base curve of the lens was 8 (D), curvature of the polarizing film was 6 (D), and the curvature of the polarizing film was shallower by 2 (D).

In Sample 1-12, the base curve of the lens was 10 (D), the curvature of the polarizing film was 8 (D), and the curvature of the polarizing film was shallower by 2 (D).

The other samples were as shown in Table 2.

As shown in Table 2, by using a high refractive lens substrate with a refractive index of equal to or higher than 1.60 and setting the difference between the polarizing film and curve of the convex surface of the lens to within 2 D, it was readily possible to set the minimum value of the distance between the inner surface of the upper mold and the polarizing film to equal to or more than 0.3 mm and equal to or less than 0.7 mm. By processing the eyeball-side surface of the semifinished lens thus obtained, it was possible to obtain a lens with a minimum lens thickness of 1.1 mm.

The present invention is useful in the field of manufacturing eyeglass lenses.

The invention claimed is:

1. A method of manufacturing a polarizing lens, which comprises:
    conducting curved surface processing to change a shape of a polarizing film into a shape of a curved surface;
    conducting heat treatment by heating the polarizing film that has been processed into a curved surface to a heating temperature of equal to or higher than 105° C. but less than 150° C.;
    assembling an upper mold, a lower mold, and a seal member to provide a casting mold having a cavity within which the polarizing film following the heating treatment is positioned, the upper mold and the lower mold being positioned opposite each other so as to sandwich the polarizing film at a space therebetween, and the seal member sealing the space between the upper mold and the lower mold;
    casting a curable composition into the cavity;
    curing the curable composition to provide a polarizing lens within which a polarizing film is positioned;
    separating the polarizing lens thus provided from the casting mold; and
moistening the polarizing film prior to the curved surface processing, wherein the polarizing film prior to curved surface processing is moistened while being heated and cooled.

2. The method of manufacturing a polarizing lens according to claim 1, wherein the cooling is conducted by placing the moistened polarizing film at room temperature.

3. The method of manufacturing a polarizing lens according to claim 1, which comprises, in the assembling of the casting mold, positioning the polarizing film such that a minimum distance between an inner surface on the cavity side of the upper mold and the polarizing film is equal to or more than 0.3 mm and equal to or less than 0.7 mm.

4. The method of manufacturing a polarizing lens according to claim 1, which comprises, in the assembling of the casting mold, adhering with an adhesive a perimeter portion of an inner surface on the cavity side of the upper mold and a perimeter portion of the polarizing film at two or more points.

5. The method of manufacturing a polarizing lens according to claim 4, wherein the seal member is a tape having an adhesive layer.

6. The method of manufacturing a polarizing lens according to claim 1, wherein the curved surface processing is conducted by pressing down with the polarizing film positioned on a convex surface mold to transfer the convex surface shape to the polarizing film.

7. The method of manufacturing a polarizing lens according to claim 6, wherein the heat treatment is conducted for the polarizing film positioned on the convex surface mold following the pressing, without removing the polarizing film from the convex surface mold.

8. The method of manufacturing a polarizing lens according to claim 1, wherein the heating temperature is equal to or higher than 120° C. but less than 150° C.

9. The method of manufacturing a polarizing lens according to claim 1, which further comprises coating a heat-curable composition on the polarizing lens that has been separated from the casting mold and then conducting heating to form a cured coating.

10. A polarizing lens, which comprises:
    a first lens substrate having an object-side surface;
    a second lens substrate having an eyeball-side surface; and
    a polarizing film, positioned between the first lens substrate and the second lens substrate, such that a minimum distance between the polarizing film and the object-side surface is equal to or more than 0.3 mm and equal to or less than 0.7 mm, wherein a difference, $R_{max}-R_{min}$, between a maximum radius of curvature $R_{max}$ and a minimum radius of curvature $R_{min}$ at a geometric center of the object-side surface is less than 4 mm.

11. The method of manufacturing a polarizing lens according to claim 1, wherein the moistening is conducted in a heated atmosphere at 50 to 90° C.

* * * * *